(12) United States Patent
Watten

(10) Patent No.: US 11,871,730 B2
(45) Date of Patent: Jan. 16, 2024

(54) MULTI-STAGE OXYGEN ABSORBER INSERT FOR CONCURRENT STRIPPING OF CARBON DIOXIDE

(71) Applicant: INNOVASEA, Boston, MA (US)

(72) Inventor: Barnaby Jude Watten, Winchester, VA (US)

(73) Assignee: INNOVASEA, Boston, MA (US)

( * ) Notice: Subject to any disclaimer, the term of this patent is extended or adjusted under 35 U.S.C. 154(b) by 90 days.

(21) Appl. No.: 17/550,193

(22) Filed: Dec. 14, 2021

(65) Prior Publication Data

US 2023/0014271 A1    Jan. 19, 2023

Related U.S. Application Data

(60) Provisional application No. 63/219,113, filed on Jul. 7, 2021, provisional application No. 63/227,105, filed on Jul. 29, 2021.

(51) Int. Cl.
| | |
|---|---|
| *A01K 63/04* | (2006.01) |
| *A01K 61/10* | (2017.01) |
| *B01D 19/00* | (2006.01) |
| *C02F 1/20* | (2023.01) |
| *C02F 1/00* | (2023.01) |

(52) U.S. Cl.
CPC ............ *A01K 63/042* (2013.01); *A01K 61/10* (2017.01); *B01D 19/0005* (2013.01); *C02F 1/20* (2013.01); *C02F 1/001* (2013.01)

(58) Field of Classification Search
CPC .. A01K 63/042; A01K 61/10; B01D 19/0005; C02F 1/20; C02F 1/001
USPC ................ 210/198.2, 221.1, 221.2
See application file for complete search history.

(56) References Cited

U.S. PATENT DOCUMENTS

| | | | |
|---|---|---|---|
| 4,205,042 A | 5/1980 | Lobdell et al. |
| 4,874,581 A | 10/1989 | Sutherland et al. |
| 4,880,445 A | 11/1989 | Watten |
| 7,008,535 B1 | 3/2006 | Spears et al. |
| | (Continued) | | |

FOREIGN PATENT DOCUMENTS

WO    WO 2007/103153 A2 *   9/2007

OTHER PUBLICATIONS

International Search Report and Written Opinion dated Oct. 5, 2022 in PCT/US2022/035964, 12 pages.

*Primary Examiner* — Fred Prince
(74) *Attorney, Agent, or Firm* — Oblon, McClelland, Maier & Neustadt, L.L.P.

(57) ABSTRACT

A low head oxygenator system includes one or more chambers, each of the one or more chambers having an open top and one or more distribution plates, each distribution plate disposed over the open top of a corresponding one of the one or more chambers. Each of the one or more distribution plates has a predetermined number of orifices uniformly distributed within one or more zones of the respective distribution plate and no orifices in at least one remaining zone of the respective distribution plate. The oxygenator system further includes a container, disposed on top of the one or more distribution plates, and configured to allow a liquid contained in the container to flow through the orifices of the one or more distribution plates into the one or more chambers. Further, use of the distribution plate frees up the head-space region for a scrubbing insert configured to perform stripping.

20 Claims, 14 Drawing Sheets

(56) References Cited

U.S. PATENT DOCUMENTS

| | | |
|---|---|---|
| 7,866,638 B2 | 1/2011 | Neumann |
| 2002/0070175 A1* | 6/2002 | Helwig .............. B01D 17/0205 |
| | | 210/221.2 |
| 2013/0247832 A1* | 9/2013 | Holder .................... C02F 3/104 |
| | | 210/150 |

* cited by examiner

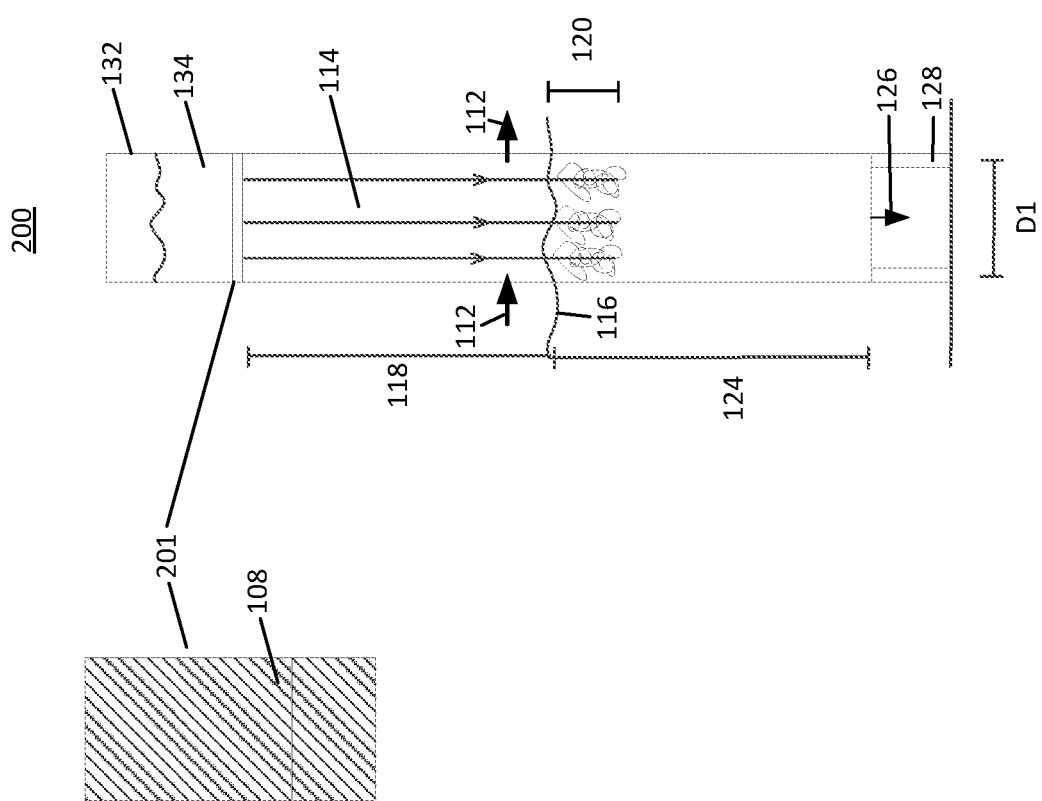

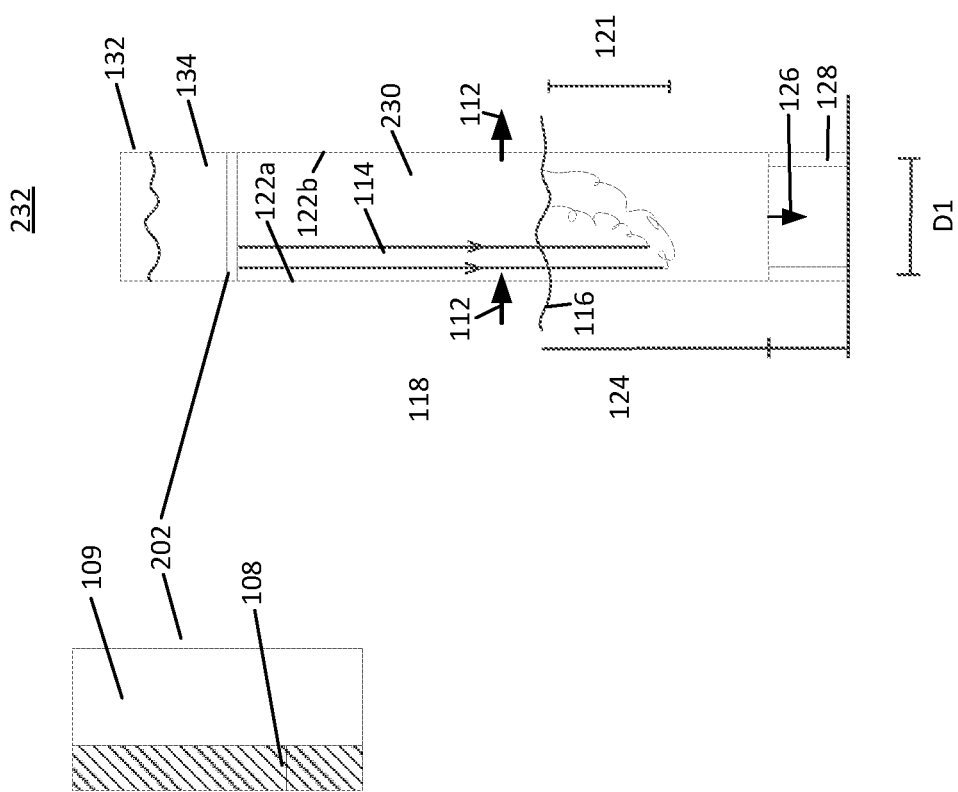

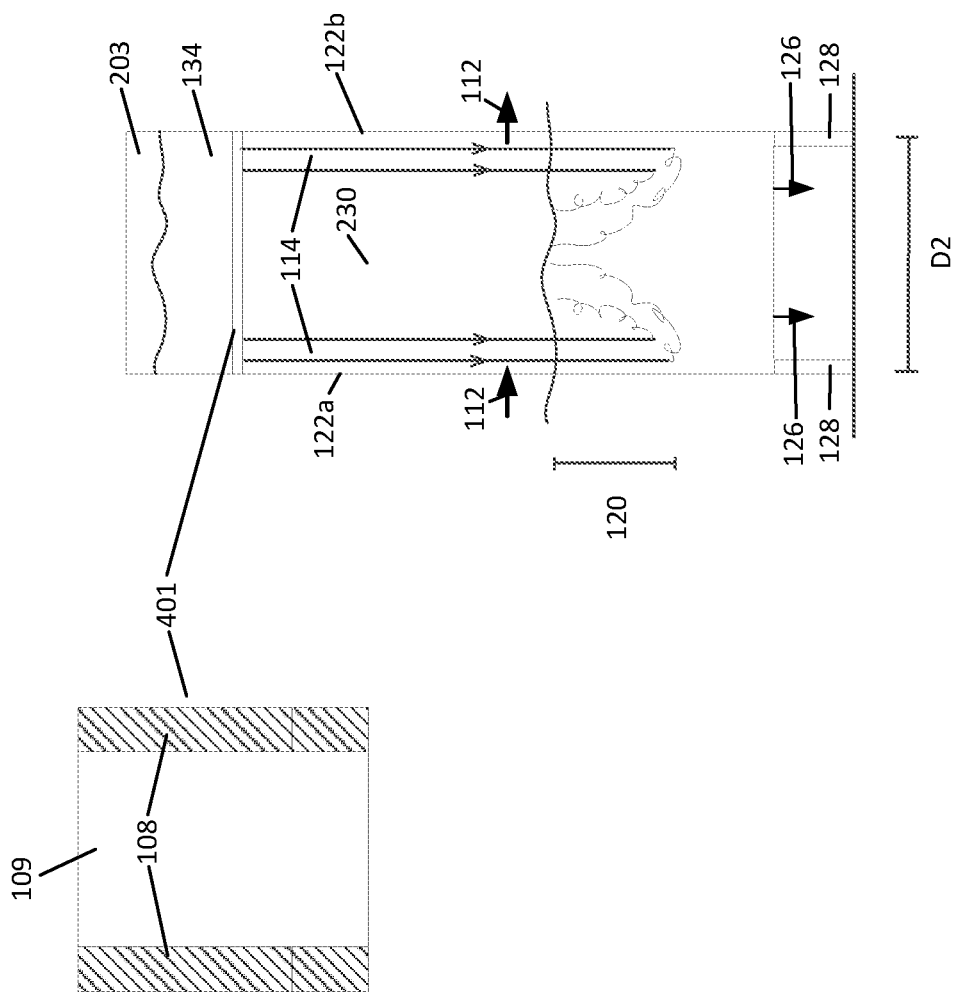

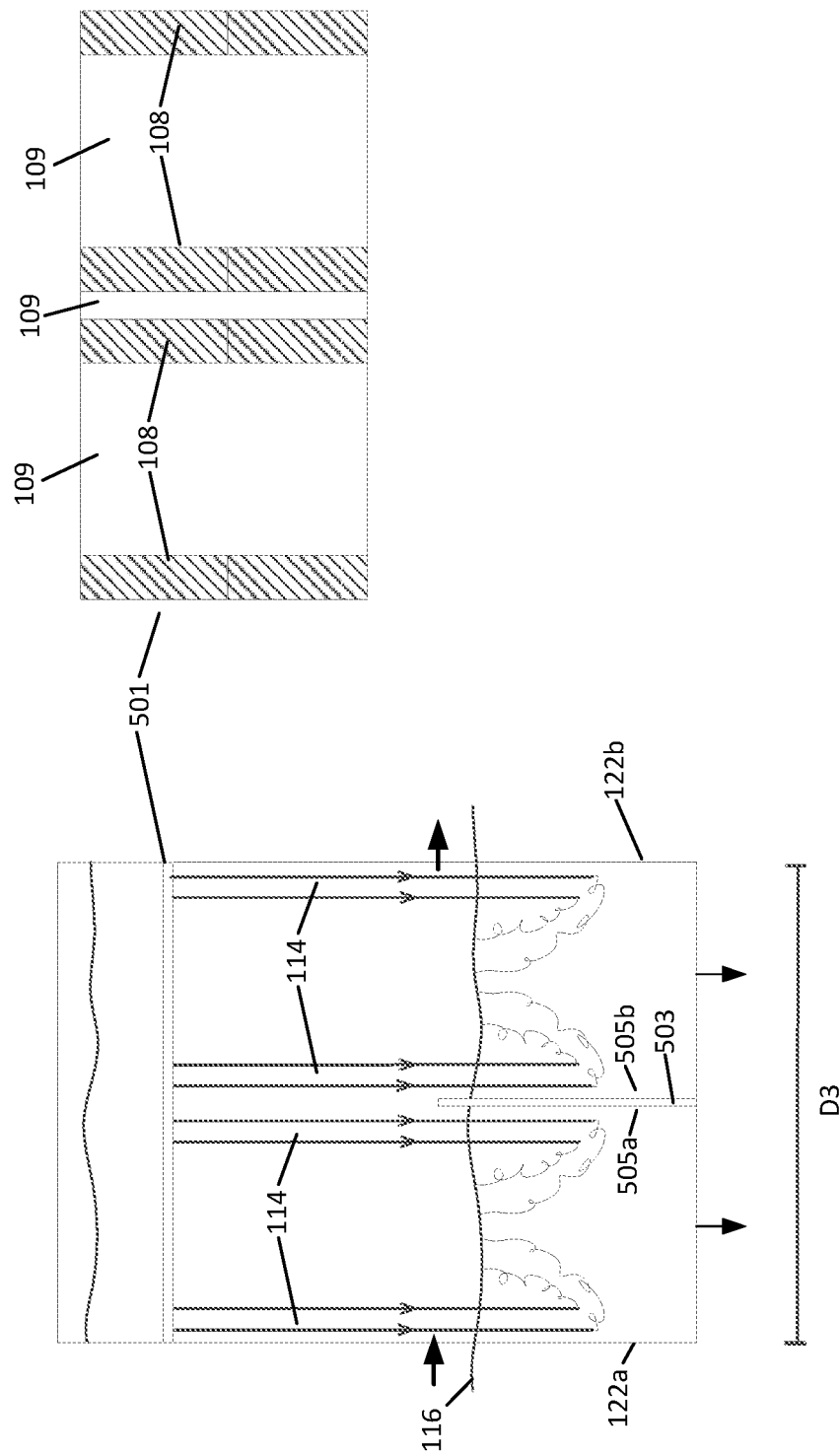

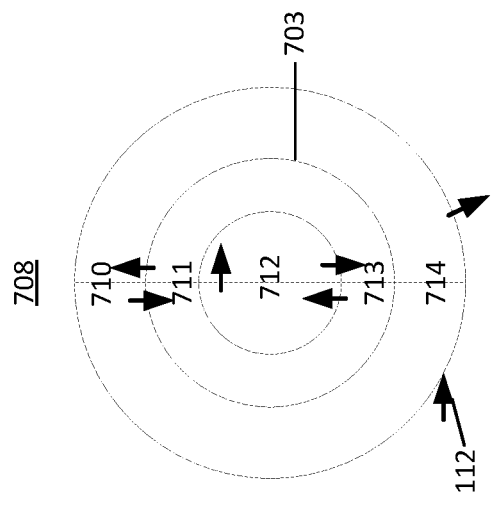
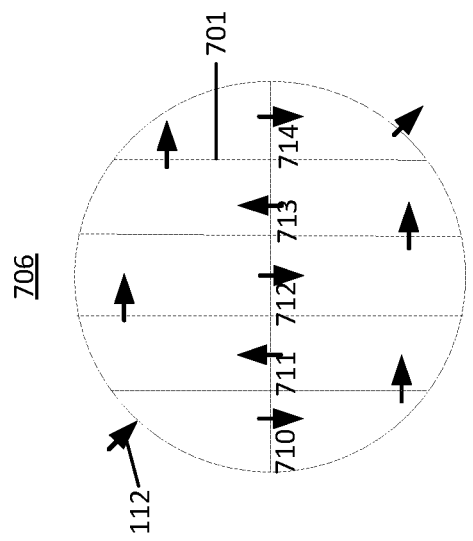
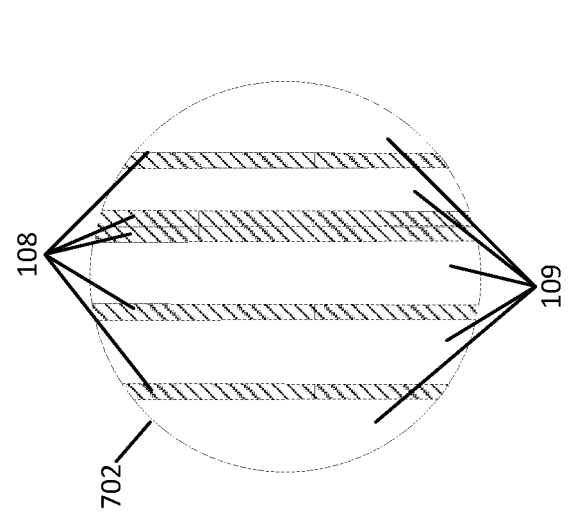
Figure 7a
Figure 7b

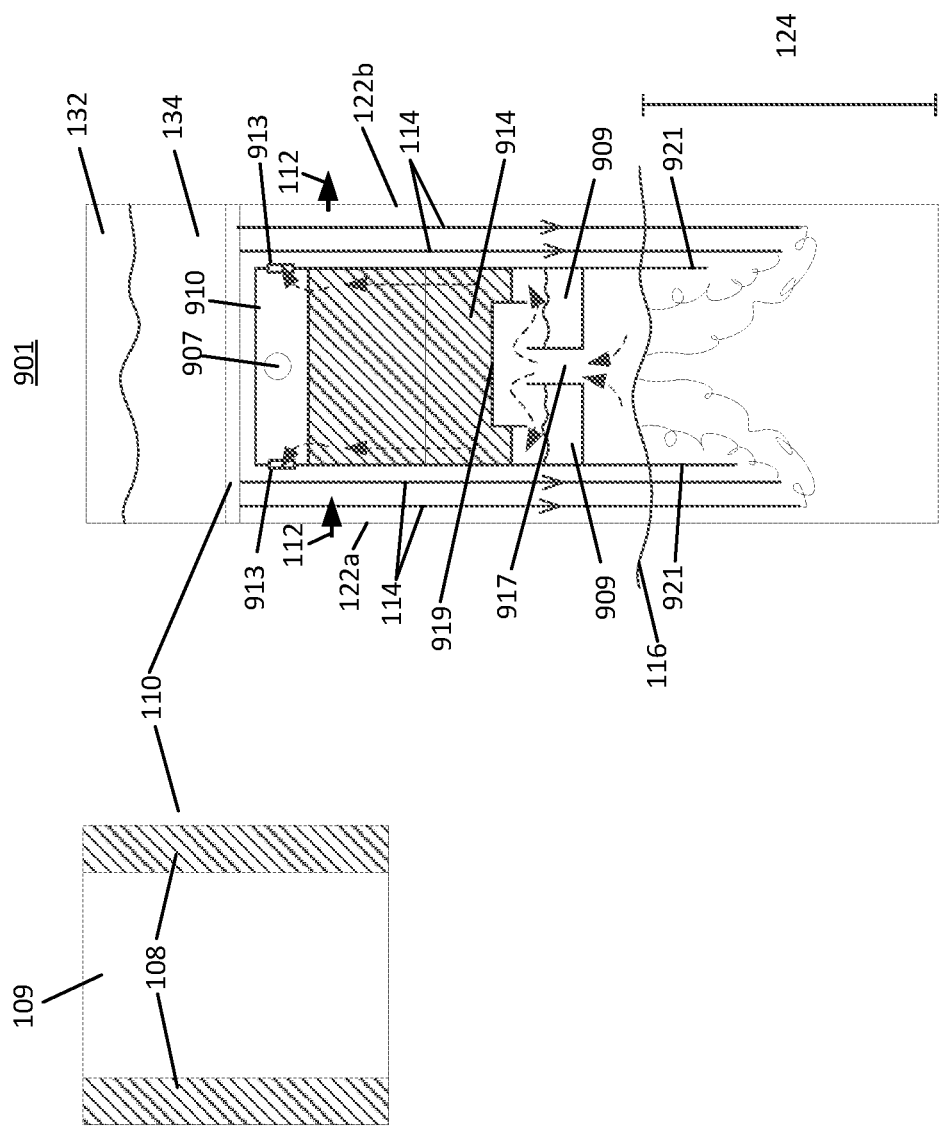

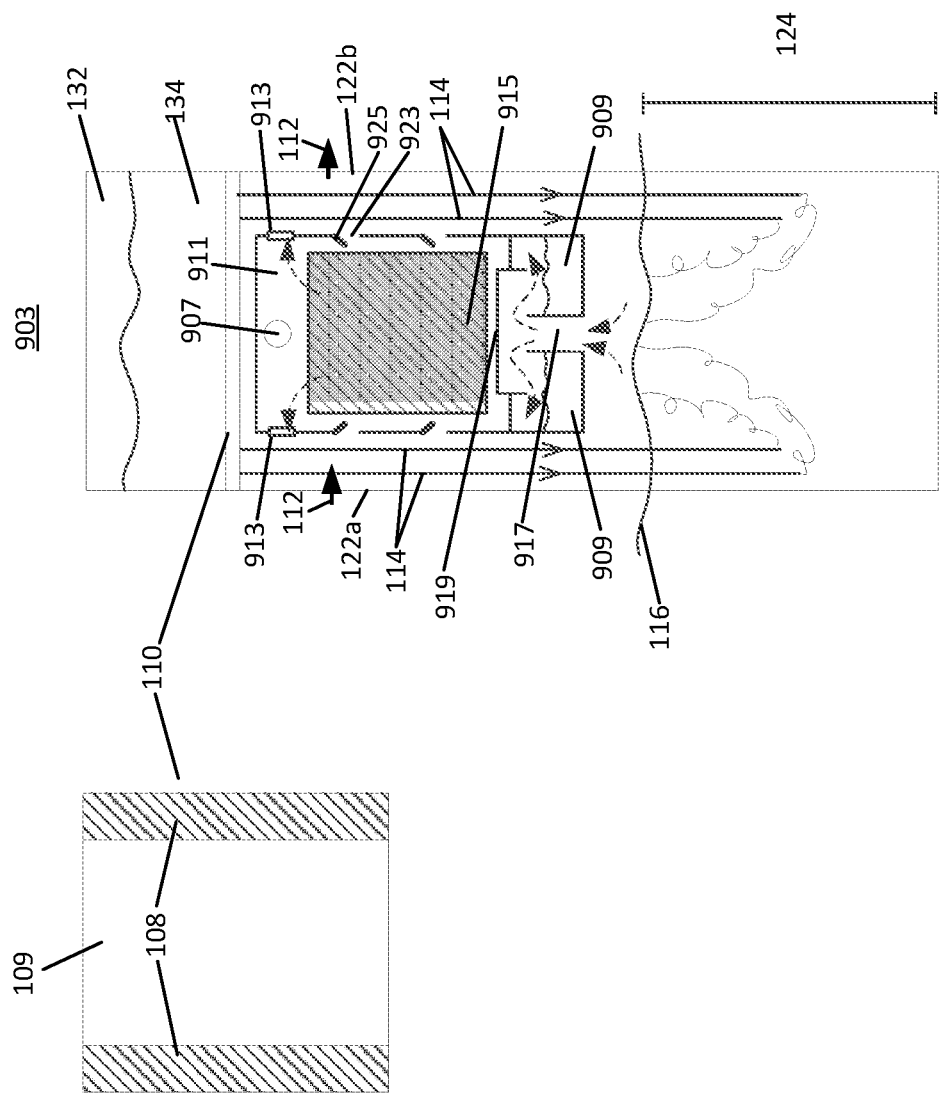

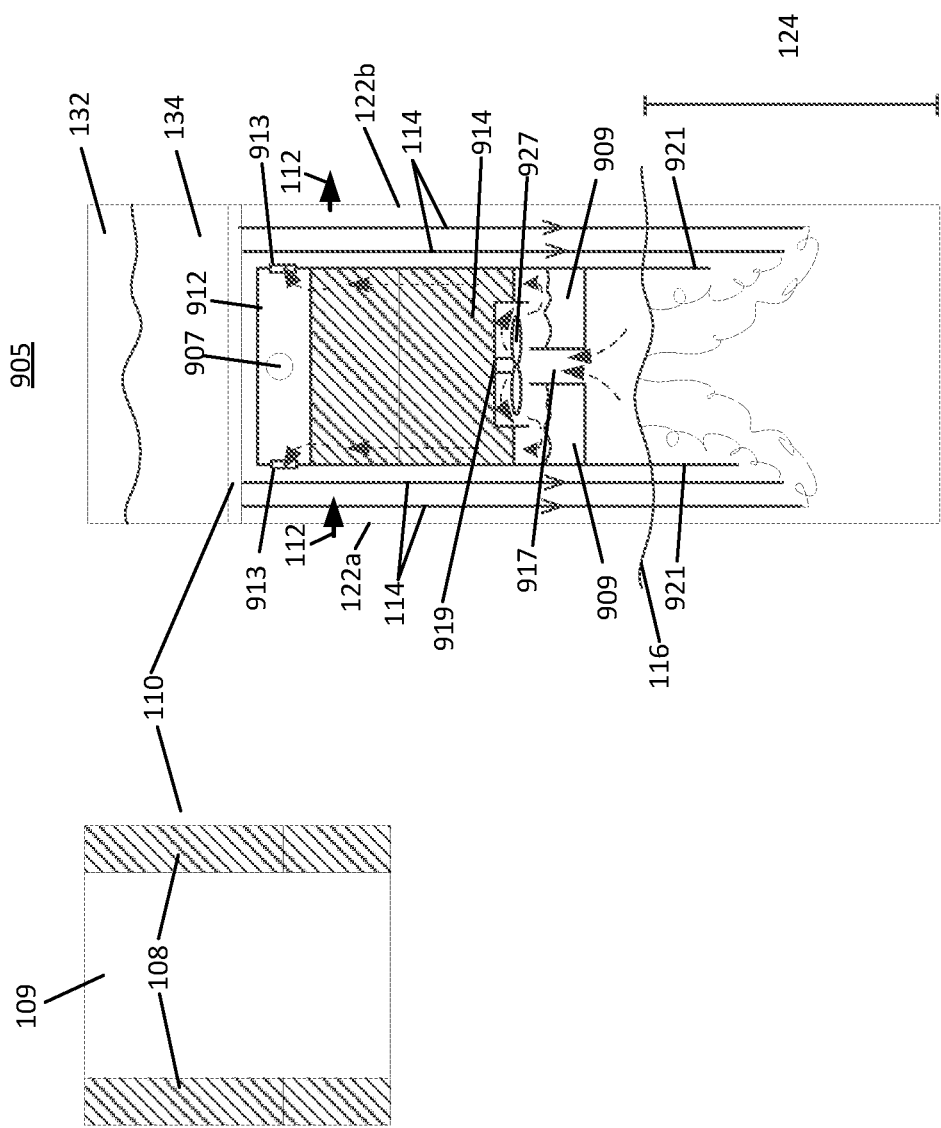

MULTI-STAGE OXYGEN ABSORBER INSERT FOR CONCURRENT STRIPPING OF CARBON DIOXIDE

CROSS-REFERENCE TO RELATED APPLICATIONS

The present application claims priority to U.S. Provisional Application No. 63/227,105 filed Jul. 29, 2021 and U.S. Provisional Application No. 63/219,113, filed Jul. 7, 2021, the teaching of which is incorporated by reference herein in its entirety for all purposes.

BACKGROUND

The aquaculture industry is growing rapidly in response to a worldwide demand for seafood that exceeds supplies provided by natural fish stocks. Intensification of production methods, such as recirculating aquaculture system (RAS) technology, is attractive given its reduced dependence on water resources. Production capacity here is restricted, most often, by a limiting supply of dissolved oxygen (DO, mg/l), as well as accumulation of dissolved carbon dioxide (DC, mg/l). DO supplementation is frequently achieved by contacting water with an oxygen enriched gas within equipment designed to provide large gas-liquid interfacial areas. These systems offer the unique ability of super-saturating water with DO, significantly reducing the volume of water that must be treated to satisfy a given oxygen demand. Reductions in water flow rate, in turn, lower production costs by minimizing water pumping as well as the size of companion treatment units, such as micro screens, that are based on hydraulic loading. Unlike air contact systems, oxygen absorption equipment provides for dissolved nitrogen (DN, mg/l) stripping below saturation levels for purposes of controlling gas bubble disease. The extent of DN stripping or DO absorption is easily regulated by adjusting gas flow and/or system operating pressure. This flexibility in performance provides additional savings in water treatment costs. Commercial oxygen purchased in bulk liquid or produced on site with pressure swing absorption equipment has significant value. Thus, the design of oxygenation equipment must provide high oxygen utilization efficiency (AE, %) with reasonable energy input (TE, kg $O_2$/kWhr). Furthermore, as oxygenation equipment is used in fish culture in a life support role, the designs employed must reduce risk of electrical or mechanical failure.

Furthermore, the high solubility of carbon dioxide precludes significant desorption within commercial oxygen absorption equipment. This characteristic has limited its application in aquaculture despite its ability to increase allowable fish loading rates. DC is typically removed by air stripping given the need for application of very high gas to liquid ratios. Forced air exchange in such air stripping systems requires significant energy input for both air compression and humidity, and temperature and carbon dioxide control within enclosed aquaculture facilities. Energy is also needed for a separate pumping requirement and/or development of additional gas-liquid interfacial areas required for gas transfer.

Common systems/methods for oxygenation and/or DC stripping in aquaculture include the U-tube, down flow bubble contactor, side stream oxygen injection, enclosed spray tower, enclosed pack column, enclosed surface agitation, packing free (standard) multi-stage LHO, addition of base reagents, and diffused oxygenation, which all have unique issues that limit their application in aquaculture. These include sensitivity to biofouling (e.g. packed column), excessive maintenance requirements (e.g., diffused oxygenation), increased energy requirements (e.g. surface agitators), high pumping costs (e.g., side-stream oxygenation), rises in pH levels (e.g. addition of base reagents), and a capital cost requirement that is dependent on local geology (e.g., u-tube oxygenation).

DC usually must be considered in the design of intensive culture systems given increased fish and microbial respiration rates, as well as the need to keep DC below criteria established to prevent stress, nephrocalcinosis, and hypoxia. As previously described, desorption of DC within commercial oxygen absorption equipment is severely limited given the high solubility of this gas species and the use, by necessity, of oxygen feed rates that represent just 0.5 to 3% of water feed rates. DC is typically removed in an independent treatment step by air stripping. This process requires a significant energy input for forced air movement, air heating in cold climates, and water pumping. Further, this air stripping drives DN towards air saturation concentrations that, in an RAS, forces use of absorber operating conditions that increase the cost of oxygenation. In other words, as DN rises, AE decreases.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present disclosure.

SUMMARY

The present disclosure is related to a low head oxygenator system comprising: one or more chambers, each of the one or more chambers having an open top; one or more distribution plates, each distribution plate disposed over the open top of one or more corresponding chambers of the one or more chambers, each of the one or more distribution plates having a predetermined number of orifices distributed within one or more zones of the respective distribution plate and no orifices in at least one remaining zone of the respective distribution plate; a container, disposed on top of the one or more distribution plates, configured to allow a first liquid contained in the container to flow through the orifices of the one or more distribution plates into the one or more chambers; and one or more scrubbing inserts, each of the one or more scrubbing inserts disposed below a corresponding distribution plate, each of the one or more scrubbing inserts configured to perform carbon dioxide stripping, wherein the first liquid flows through the orifices of the one or more distribution plates to create jets between a wall of the corresponding chamber and a corresponding scrubbing insert, the jets enter a second liquid held within each of the one or more chambers at one or more regions disposed directly below the one or more zones of the one or more distribution plates having the orifices, to create one or more circulation cells of bubbles, and gas generated by the one or more circulation cells of bubbles moves upward into and through a corresponding scrubbing insert, which strips carbon dioxide from the gas.

The present disclosure is also related to a low head oxygenator system comprising: a chamber, having one or more chamber walls and an open top, configured to hold a first liquid; a distribution plate disposed over the open top and configured to create one or more circulation cells of bubbles in the first liquid, wherein the distribution plate has a predetermined number of orifices located in one or more zones of the distribution plate and at least one remaining zone of the distribution plate having no orifices; a container, disposed on top of the distribution plate, configured to allow a second liquid contained in the container to flow through the predetermined number of orifices towards the first liquid for creating the one or more circulation cells of bubbles; and a scrubbing insert configured to perform stripping of gas released by the one or more circulation cells of bubbles, wherein the scrubbing insert is disposed below the distribution plate.

The present disclosure is also related a method of performing high efficiency oxygenation using a low head oxygenator system including one or more chambers, one or more distribution plates disposed over one or more corresponding chambers, a container disposed over the one or more distribution plates, one or more scrubbing inserts disposed below corresponding distribution plates, and a gas input into each of the one or more chambers, the method comprising: providing a first liquid in the container, such that the first liquid flows through orifices in the one or more distribution plates into the one or more chambers to form one or more circulation cells of bubbles in a second liquid contained in the one or more chambers, each of the one or more distribution plates having a predetermined number of orifices uniformly distributed within one or more zones of the respective distribution plate and no orifices in at least one remaining zone of the respective distribution plate; providing a first gas through the gas input to each of the one or more chambers, causing the first gas to flow through a head-space portion of each of the one or more chambers, above the second liquid; providing a scrubbing reagent to a packed bed disposed within each of the one or more scrubbing inserts; and directing at least some of a second gas released by the one or more circulation cells of bubbles through the packed bed to react with the scrubbing reagent and form treated gas, wherein the first liquid flowing through the orifices in the one or more distribution plates creates jets that come in contact with the first gas in the head-space portion of the respective chamber and then enter the second liquid held within the respective chamber at regions disposed directly below the one or more zones of the corresponding distribution plate having the orifices, to create the one or more circulation cells of bubbles in the second liquid held within the respective chamber.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1a shows a top view of a standard distribution plate and a side view of an LHO single chamber depicting bulk flow using a related distribution plate;

FIG. 1b shows a top view of a side-flow distribution plate and a side view of an LHO single chamber depicting bulk flow using the side-flow distribution plate, according to an exemplary embodiment of the present disclosure;

FIG. 4 shows a top view of a distribution plate having two sets orifices, and a side view of an LHO chamber employing the distribution plate to create jets along two ends of chamber walls, according to an exemplary embodiment of the present disclosure;

FIG. 5 shows a top view of a distribution plate having four sets of orifices and three solid regions between the orifices, and a side view of an LHO chamber employing the distribution plate to create two sets of jets along two ends of chamber walls, and two sets of jets along a vertical baffle, according to an exemplary embodiment of the present disclosure;

FIG. 7a shows a top view of head-space gas movement through a circular LHO oxygenation system having ten chambers, and a top view of a distribution plate that can be used with the system, according to an exemplary embodiment of the present disclosure;

FIG. 7b shows a top view of head-space gas movement through a circular LHO oxygenation system having six chambers, and a top view of a distribution plate that can be used with the system, according to an exemplary embodiment of the present disclosure;

FIG. 9A shows a top view of a distribution plate having two sets of orifices, and a side view of an LHO chamber employing the distribution plate to perform stripping using a scrubbing insert, according to an exemplary embodiment of the present disclosure;

FIG. 9B shows a top view of a distribution plate having two sets of orifices, and a side view of an LHO chamber employing the distribution plate to perform stripping using a scrubbing insert, according to an exemplary embodiment of the present disclosure;

FIG. 9C shows a top view of a distribution plate having two sets of orifices, and a side view of an LHO chamber employing the distribution plate to perform stripping using a scrubbing insert, according to an exemplary embodiment of the present disclosure.

DETAILED DESCRIPTION

Figure 2A:
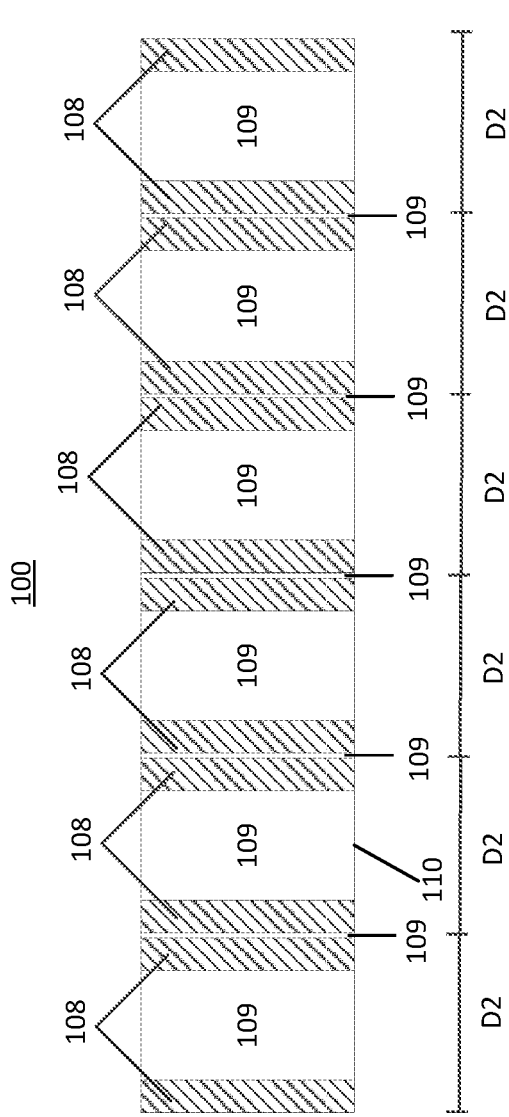
FIG. 2a shows a top view of a side-flow distribution plate placed over an LHO oxygenation system having six chambers, according to an exemplary embodiment of the present disclosure.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

This disclosure is directed towards new distribution plate designs that act to focus jet kinetic energy over limited areas of the chamber cross-section, thereby increasing local turbulence and establishing new fluid (gas and water) circulation cells so as to enhance gas transfer without exceeding plate hydraulic loading criteria. The new configuration improves the AE and TE of LHO equipment. This includes single-stage and multi-stage side stream oxygenation equipment operated at positive gage pressures (O2 demand peaking support), as well as systems operating at negative gage pressures (DN desorption).

The systems and methods described herein allow for economical and effective treatment of aqua-cultural waters with commercial oxygen for oxygenation, and for nitrogen and/or carbon dioxide stripping so as to increase production capacity while also circumventing gas bubble disease.

An advantage of the LHO distribution plate design discussed herein lies with its unique capability to enhance gas transfer for existing or selected spray fall heights or to reduce spray fall heights required for a target DO supplementation rate. Both responses act to decrease water treatment costs. Further, the new plate design opens up the possibility of modifying the chamber, with minimal effort, to allow for concurrent DC stripping. The latter modification can reduce energy costs linked to DC control. Again, application opportunities exist in the (1) retrofit of LHO equipment currently in use (2), new or proposed LHO designs and (3), new chambers intended to operate at positive or negative gage pressures. While the focus of this application is on aqua-cultural applications, the advantages of the described oxygen transfer system will also extend to other oxygenation applications, such as in municipal or industrial wastewater treatment.

The present disclosure describes a new LHO feedwater distribution plate and LHO structure, designed to extend standard LHO performance without additional energy input (pumping). The plate design, and unique application method described herein, provides a local increase in momentum transfer, thereby creating elevated shearing forces, promoting development of a well-defined circulation cell, or cells, within an LHO chamber, and causing (1) acceleration of the vertical displacement of bubble swarms, (2) increases in penetration depth (Hp), (3) ascension of bubbles throughout regions of the pool not receiving feed water jets, and (4) promotion of re-exposure of water present in the chamber to the action of jets through enhanced mixing. Physical changes 1-4, combined, result in enhanced rates of gas transfer for existing or selected spray fall heights ($L_O$), or reduced $L_O$ requirements for a desired DO supplementation rate.

The distribution plate discussed herein frees up space in the head-space region of chambers to perform DC stripping. Previous spray tower oxygen absorbers for concurrent DC stripping avoided the problems with the air stripping step in related systems by allowing DN in an RAS to drop below saturation concentrations, thereby reducing oxygen feed requirements and lowering total dissolved gas pressures below levels that result in gas bubble disease. In operation, DC desorption was achieved by directing head space gases from the spray tower (e.g. $O_2$, $N_2$, $CO_2$) through a sealed packed bed scrubber receiving a sodium hydroxide (NaOH) solution. DC was selectively removed from the gas stream by chemical reaction, forming the product $Na_2CO_3$. Scrubber off-gas, lean with regard to $CO_2$ but still rich in $O_2$, was subsequently redirected through the spray tower for further stripping of $CO_2$ and absorption of $O_2$. Make-up NaOH was fed into the scrubbing solutions recirculation sump as directed by a pH-based control loop. Spent NaOH solution, collected as an overflow, was then regenerated for reuse in a batch process that used relatively inexpensive hydrated lime ($Ca(OH)_2$). Scrubber irrigation rates represented a fraction of the spray tower water flow rates. While effective, this modification required two sealed gas transfer units coupled with a blower-assisted gas recirculation loop. This requirement can be dropped when using the new distribution plate design according to the present disclosure, as the new distribution plate design frees up about 75% of the head space volume available in an LHO, according to one embodiment. In one embodiment of the present disclosure, the scrubbing unit is nested within the chamber's head space and positioned immediately adjacent to feed water jets. This allows for diffusion and/or a redirection of entrained gas, which is $CO_2$ rich, into the scrubber component for reaction with NaOH or other $CO_2$ scrubbing reagents (e.g. hydrated lime).

In some of the applications discussed herein, packing is absent from individual chambers, thus relying solely on water jets developed by water distribution plates to provide needed gas-liquid interfacial areas. The latter is provided by jet surfaces as well as by the impact of the jets on the free surface of water within the chamber. Gas entrainment occurs at the impact site with bubbles forced, under turbulent conditions, to a depth of up to 0.5 m, according to one embodiment. Bubble size, entrainment depth and the resulting mass transfer potential is related to water salinity, jet diameter, jet velocity, spray fall height, temperature, and surface hydraulic loading on the feed water distribution plate. The surface hydraulic loading on the distribution plate, in freshwater applications, is limited to about 68 kg/m²/sec, which correlates to a downflow water velocity in the stilling zones of the LHO chambers of 6.8 cm/sec. Operating above this critical velocity, with a stilling zone depth of about 46 cm, causes entrained gas to be swept out of the discharge end of the LHO chambers, wasting oxygen enriched gas and thus reducing AE.

The standard LHO, without packing, relies on water jets developed by perforated water distribution plates to provide gas-liquid interfacial areas required for gas transfer. The plates used, to date, place jet locations uniformly over chamber cross sections. This disclosure describes new, more efficient, distribution plate designs that focus jet action over limited areas of the chambers cross section. Here the number of jets is fixed and equal to the standard plate requirements, but spacing between jets is reduced by a factor of up to 80%. Further, the jet group created is positioned, strategically, along one side or at the end of a standard rectangular LHO contact chamber allowing a wall effect to direct water and entrained gas bubbles to flow parallel to the free surface of the chamber, at depth, prior to ascending towards the head space region of the chamber. The result is to increase local turbulence and gas hold up while still complying with criteria established for hydraulic loading (e.g. 68 kg/m2/sec). Turbulence and gas hold up, in turn, influence the overall mass transfer coefficient ($K_La$) that governs the rate of gas transfer along with the dissolved gas deficit ($C^*-C$). In differential form, the relationship is expressed as:

$$\frac{dc}{dt} = (K_L a)_T (C^* - C) \qquad (1)$$

The coefficient $K_La$ reflects the conditions present in a specific gas-liquid contact system. This coefficient is defined by the product of the two ratios ($D/L_f$) and ($A_f/Vol$), where D is a diffusion coefficient, $L_f$ is liquid film thickness, and $A_f$ is the area through which the gas is diffusing per unit volume (Vol) of water being treated. Values of $K_La$ increase with temperature (° C.) given viscosity's influence on D, $L_f$ and $A_f$ as described by the expression:

$$(K_L a)_T = (K_L a)_{20} (1.024)^{T-20} \qquad (2)$$

Although each gas species in a contact system will have a unique value of $K_La$, relative values for a specific gas pair are inversely proportional to their molecular diameters:

$$\frac{(K_L a)_1}{(K_L a)_2} = \frac{d_2}{d_1} \qquad (3)$$

Equation (3) provides a convenient means of modeling multicomponent gas transfer processes, such as the addition of DO and the stripping of DN and DC, which occurs concurrently in pure oxygen absorption equipment. Here the dissolved gas deficits ($C^*-C$) that drive gas absorption and desorption rates are manipulated within the boundaries of the gas-tight chambers by elevating the mole fraction, X, of oxygen above that of the local atmosphere (0.20946), i.e., the saturation concentration of a gas in solution ($C^*$) is determined by its partial pressure in the gas phase ($P_i$), liquid temperature and liquid composition as related by Henry's law. In equation form:

$$C^* = BK1000\left(\frac{X(P_T - P_{H_2O})}{760.0}\right) \qquad (4)$$

where B is the Bunsen solubility coefficient, K is a ratio of molecular weight to molecular volume and $P_{H2O}$ is water vapor pressure. Partial pressure ($P_i$) represents the product of total pressure ($P_T$) and gas phase mole fraction X following Dalton's Law:

$$P_i = (P_T)(X) \qquad (5)$$

The increase in $C^*_{O2}$ achieved through elevation of $X_{O2}$, and in some cases $P_T$, accelerates the rate of gas transfer thus minimizing equipment scale and providing for an effluent DO level in excess of the local air saturation concentration. Ignoring the effects of minor gas species, increases in $X_{O2}$ will concurrently reduce the mole fraction and hence the $C^*$ of DN following the relationship $X_{N2}=1-X_{O2}$. The negative dissolved gas deficits that often result provide for DN stripping. Given the potential for gas bubble disease, the net effect of changes in DO and DN must not result in exposure of fish to total dissolved gas pressures (TGP) that exceed local barometric pressures (Bp), i.e., Delta P must be less than or equal to BP where Delta P=TGP-BP. TGP here represents the sum of dissolved gas tensions (GT, mm Hg) for all gas species (i) present. $GT_i$ is defined as the product $(C_i)(760/1000 \ K_i)(B_i)$.

Air entrainment of a plunging liquid jet increases with the velocity dependent Froude Number: $FR=V^2/(gd)$ where g is gravity and d is nozzle diameter. The velocity of the jets exiting LHO distribution plates ($V_o$) are, by design, relatively low given the need to minimize pressure drop. Jet velocity at the impingement point, however, represents the sum of $V_o$ plus velocity gains from gravity as described by the relation: $Vj=(V_o^2+2 \ gL)^{0.5}$ where L is the elevation change from the nozzle discharge to the free surface receiving the jet. In an LHO, gravity effects on Vj are significant. For example, with a pressure drop of 15.2 cm $H_2O$ across the orifice, common in LHO designs, $V_o$ is 1.38 m/s but increases by a factor of 2.64 to a Vj of 3.65 m/s when L is just 0.609 m. The net power of the jet (Nj), important in promoting $K_La$, increases with the square of Vj at a given volumetric flow rate Q: $Nj=0.5 \ Q \ p \ Vj^2$, where Nj is in Watts and p is liquid density.

The positive effect of Nj on $K_La$ is due to enhanced momentum transfer from the jet increasing the volume and penetration depth of entrained gas as well as turbulence/shear forces acting to reduce bubble diameter and associated liquid film thickness ($L_f$, Equation 1). Small bubbles provide longer ascension exposures in the receiving pool as well as more surface area, A, than large bubbles. Nj in previous LHO applications has been restricted by (1) the hydraulic loading rate criteria of 68 kg/m²/sec designed to eliminate bubble carryover in the effluent and (2), the need to minimize feed water head requirements at the distribution plate. There is a need for more efficient distribution plate designs that provide the benefits described of an increasing Nj without exceeding limitations 1 and 2 above. This disclosure addresses this need by manipulation of the orifice plate hole schedule and by exploiting the unique geometry of individual LHO reaction chambers.

Referring now to the drawings, FIG. 1a illustrates a standard distribution plate 201 used in a standard LHO chamber 200, where the width across the shorter dimension of the standard LHO chamber 200 is represented by $D_1$. The standard distribution plate 201 includes a region (represented by the hashed lines) with orifices 108 distributed throughout. When liquid 134 is contained in the trough 132, the liquid 134 flows through the orifices 108 to form jets 114. The jets 114 fall through the spray fall zone 118, which includes gas (e.g. oxygen) that can be input/output using the gas ports 112. When the jets 114 contact the free water surface 116, they penetrate the water down to a particular depth, creating a bubble entrainment zone 120. Also shown in FIG. 1a is the stilling zone 124, discharge slot 126, and support legs 128. While the present exemplary embodiment includes a trough 132, other system configurations may use different containers in lieu of the trough 132, such as vacuum chambers. Further, the discharge slot 126 is optional. For example, if the LHO chamber 200 is to be a vacuum, the discharge slot 126 can be removed. Exemplary embodiments in a vacuum degasser or medium pressure oxygenator will be discussed in more detail in another portion of the present disclosure.

In an example employing actual values, the standard distribution plate 201 has a uniform distribution of 29 jet orifices 108 (d=9.53 mm) over a single LHO chamber 200 with a cross section measuring 12.7 cm×35.6 cm. In use, jet impingement provides a point source of entrained head space gas. The bubbles formed in the bubble entrainment zone 120 are advected vertically downstream while diffusing radially. Radial expansion of the bubble swarm with depth reduces local turbulence and downward velocities, allowing bubble release and ascension in open areas between adjacent jets. Hence the bubble entrainment zone 120 is dynamic with gas moving in both vertical directions while bulk liquid flows steadily, with some dispersion, toward the lower discharge end of the chamber. When Q=170.3 l/min, $V_o$, based on $Q/A_{jet}$, is 1.37 m/sec. In this exemplary, L, of 0.308 m Vj rises to 2.803 m/s which provides an Nj for the sum of the jets of 11 Watts. The corresponding power applied per unit cross section is 243.4 Watts/m².

On the other hand, FIG. 1b illustrates a side-flow distribution plate 202 used in an LHO chamber 232, according to an embodiment of the present disclosure. A first zone of the side-flow distribution plate 202 has orifices 108, while a second zone is a solid region 109 without orifices. Used in the LHO chamber 232, liquid 134 in the trough 132 falls through the orifices 108 to create jets 114 along or adjacent to chamber wall 122a, but not chamber wall 122b. The jets 114 are not along chamber wall 122b because the solid region 109 of the side-flow distribution plate 202 prevents the liquid 134 from flowing through. In other words, there are portions of the free water surface 116 that are exposed to the jets 114, while there are other portions of the free water surface 116 not exposed to the jets 114. As the jets 114 pass through the spray fall zone 118 and contact the free water surface 116, they penetrate the water to create a bubble entrainment zone 121, which is deeper than the bubble entrainment zone 120 created in the LHO chamber 200 from FIG. 1a.

In an embodiment, FIG. 1b shows the new distribution of jet orifices 108 on the side-flow distribution plate 202. While the side-flow distribution plate 202 has the same dimensions and same number of orifices as the standard distribution plate 201 from FIG. 1a, the orifices are located in a subregion of the side-flow distribution plate. Jets 114 are created in two parallel rows along or adjacent to the length of one side of the chamber (i.e. chamber wall 122a), focusing Nj over just 31.5% of the available area. While the total applied jet power Nj is identical to the standard design, the power applied per unit cross section (active area) is increased 3.18-fold to 774 Watts/m². The two-phase flow conditions established here are quite different than the standard design—the increase in Nj applied in the limited jet impact zone along with the positioning of the jets 114 near or adjacent to the chamber wall 122a provide a local increase in momentum transfer, creating elevated shearing forces as well as promoting the development of a well-defined circulation cell that accelerates vertical displacement of the bubble swarm. This leads to a greater penetration depth, Hp, as the wall adjacent to nozzle positions constrains radial expansion of the diverging bubble swarm, forcing the release of bubbles, at depth, across the short dimension $D_1$ of the LHO chamber 232. This results in the ascension of bubbles throughout regions of the pool not receiving feedwater jets 114. Field trials of the side-flow distribution plate 202, under the conditions of the above example, have demonstrated a 34.5% increase in Hp when compared to the standard distribution plate 201 design without undo bubble carryover in the chamber's effluent. Further, the circulation cell of bubbles developed in the bubble entrainment zone 121 increases the potential for re-exposure of feed water present in the LHO chamber 232 to the action of the jets 114.

Flow rate and pressure drop of a system design determine the number of orifices needed for a specific distribution plate application. Orifice shape and diameter can vary. In an embodiment, the shape is circular with diameters ranging from 0.25 to 0.5 inches. The flow potential $Q_1$ of a single orifice can be derived from the energy equation $$Q_1 = 3.1417\left(\frac{d}{2}\right)^2 (2GH)^{0.5}(CL) \tag{6}$$

where $Q_1$ is flow in $$\frac{ft^3}{sec},$$

d is orifice diameter in feet, G is gravity $$(32.2 \frac{ft}{sec^2}),$$

H is pressure drop across the orifice in feed water, and CL is the orifice geometry specific loss coefficient, which can vary from about 0.6 to 0.9 in one embodiment. CL decreases as the distribution plate thickness increases. Small diameter orifices can be more prone to fouling and physical blockage with solids than large diameter holes, but $K_L a$ typically will decrease as orifice diameter increases. The total number of orifices required is then $$\frac{Q_{target}}{Q_1},$$

where $Q_{target}$ is the total flow to be treated in $$\frac{ft^3}{sec}.$$

In one embodiment, the area(s) of the distribution plate devoid of orifices can represent 65-80% of the total distribution plate area. In other words, the area(s) of the distribution plate having orifices can represent 20-35% of the total area of the distribution plate. Note that the area of the distribution plate having the orifices is not referring to the sum of the individual orifice cross sectional areas representing 20-35% of the distribution plates area, but is instead referring to the area of the distribution plate that is involved; this includes the area between the individual orifices, the space between the first row of orifices and the chamber walls as well as the orifice cross sectional areas. Thus, when the one or more areas of the distribution plate having the orifices cover an area between 20%-35% of a total area of the distribution plate, only a fraction of that area will be made up by the cross sectional areas of orifices.

Orifices can be spaced accordingly to a minimum spacing between an orifice location and a chamber wall selected so as to avoid clinging wall flow that would interfere with jet impingement. This offset can be 0.5 to 1.5 inches in one embodiment, but can vary with orifice diameter and spray fall height. Further, orifice spacing can be designed to avoid jet to jet interaction in the spray zone or head space of the chambers.

Of course, the above examples illustrate only one embodiment, and many variations can exist. For example, FIG. 2a shows a cross sectional top view of a distribution plate 110 installed in an LHO 100 having six chambers 101, 102, 103, 104, 105, 106, according to one embodiment. The width across the shorter dimension of each of the six chambers 101, 102, 103, 104, 105, 106 is $D_2$, where $D_2=2*D_1$. The distribution plate 110 has multiple regions of orifices 108, as well as one or more solid regions 109 between regions of orifices 108. In one embodiment, a single distribution plate can be installed over multiple chambers making up an LHO. Alternatively, in one embodiment, a corresponding distribution plate can be installed over each chamber making up an LHO.

Figure 2B:
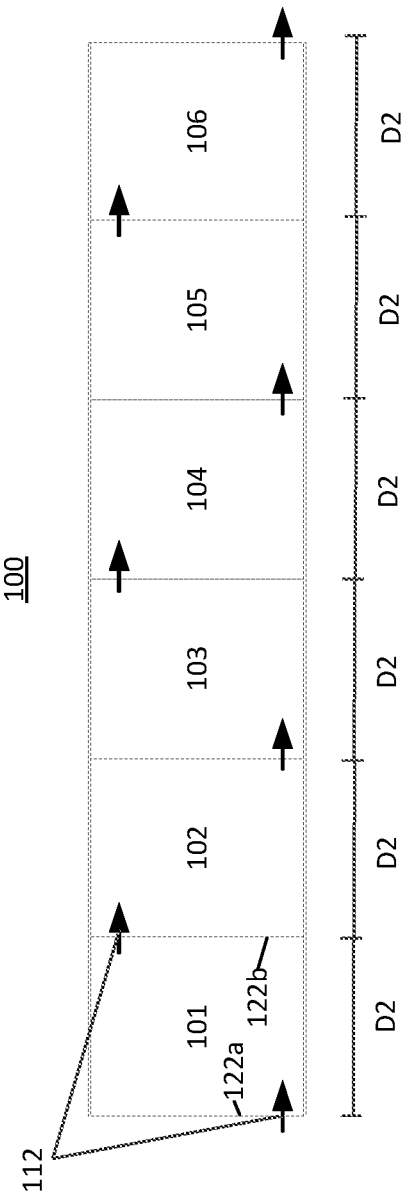
FIG. 2b shows a top view of head-space gas movement through the LHO oxygenation system having six chambers, according to an exemplary embodiment of the present disclosure.

FIG. 2b shows a cross sectional top view of the LHO 100 having six chambers 101, 102, 103, 104, 105, 106, where each chamber has chamber walls. For example, chamber 101 has chamber walls 122a and 122b. Also shown are gas ports 112, which allow gas to flow through the head-space region of each chamber. The gas ports 112 can be an off-gas vent and/or a gas feed source. Note that adjacent gas ports 112 are offset from each other, allowing gas to travel throughout respective chambers. For the sake of simplicity, chambers walls and gas ports for chambers 102, 103, 104, 105, 106 are not labelled, though it should be understood they exist.

Figure 2C:
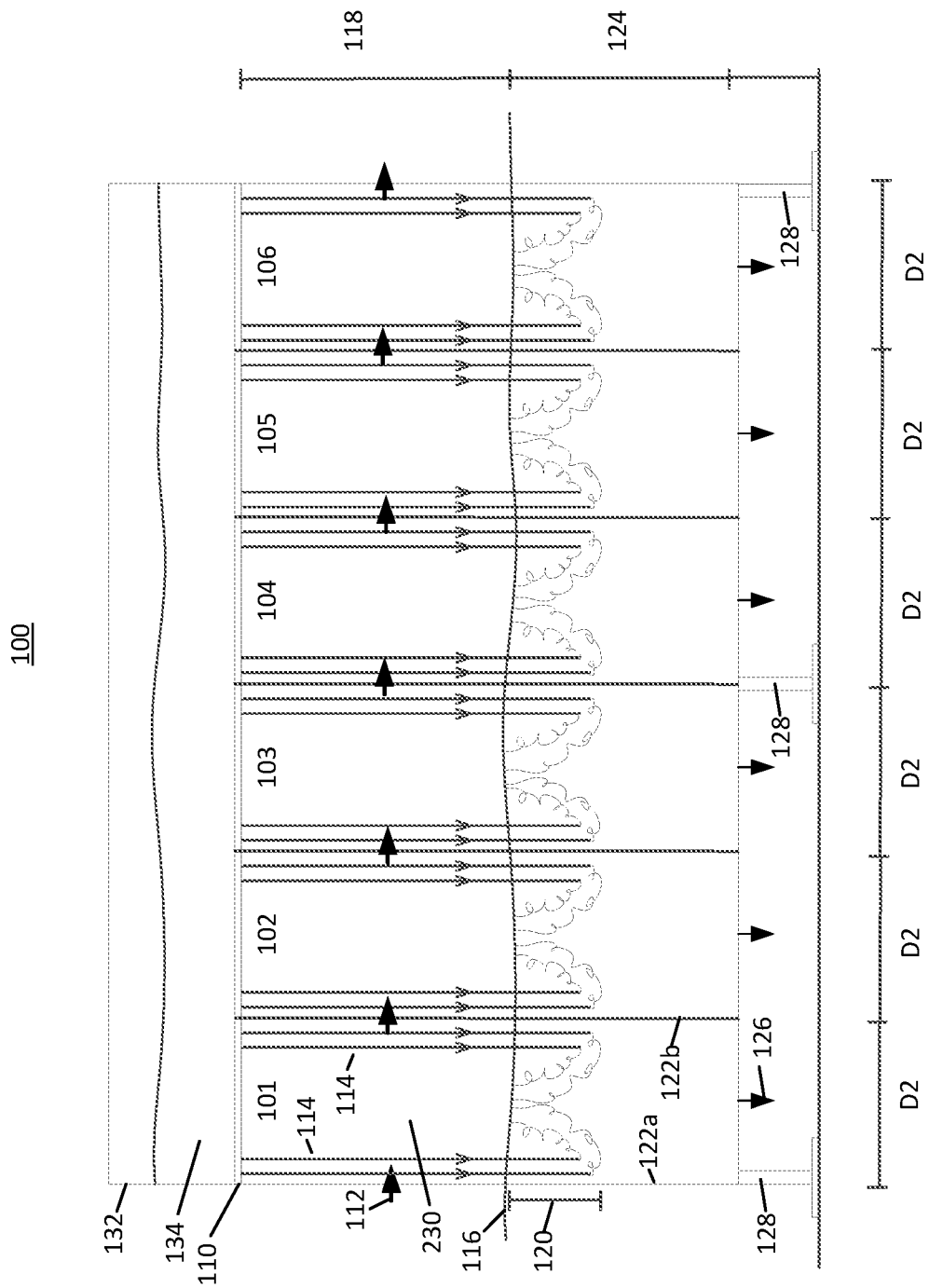
FIG. 2c shows a side view of the LHO oxygenation system having two counter rotating circulation cells in the bubble entrainment zones for each of the six chambers, according to an exemplary embodiment of the present disclosure.

FIG. 2c shows a side view of the LHO 100. In chamber 101, jets 114 fall along chamber walls 122a, 122b on both sides, leaving an inner portion of the free water surface 116 in chamber 101 unexposed to the jets 114, and thereby creating two counter rotating circulation cells in the bubble entrainment zone 120. This scenario discussed with respect to chamber 101 also happens for the other chamber 102, 103, 104, 105, 106 in the LHO 100.

In an embodiment, the design shown in FIGS. 2a, 2b, and 2c incorporates six identical chambers 101, 102, 103, 104, 105, 106 (i.e. reactor stages) with a total flow capacity of about 2044 l/min. Total head loss across the LHO 100 is just 0.74 m. Liquid 134 (e.g. water) flows into the inlet trough 132 by gravity, then is distributed along both sides of individual chamber walls for each chamber 101, 102, 103, 104, 105, 106 via the distribution plate 110.

In an embodiment, referring to FIG. 2a, the top view of the LHO 100 with the distribution plate 110 installed provides the orifice locations on the distribution plates 110—29 jets per chamber wall, distributed in two rows over an area representing 15.9% of each chambers' width (25.4 cm), i.e., row one and row two are 2.4 and 3.6 cm from the chamber walls, respectively. The effective diameter of the orifices 108 is 9.53 mm. The water level in the inlet trough 132 is about 12.7 cm. Jets 114 developed drop 61 cm through the head space regions 230 of each chamber 101, 102, 103, 104, 105, 106 before impacting the free water surface 116 of the stilling zone. Treated water exits an individual chambers lower open end that is 10.2 cm above the floor of the receiving sump via discharge slots 126.

In an embodiment, the top view of FIG. 2b, shown without the distribution plate 110 installed, also indicates gas flow direction as the gas moves in series through chambers 101, 102, 103, 104, 105, 106 via gas ports 112 prior to exiting a 1.9 cm diameter off-gas vent. The gas moves via a pressure differential generated by an oxygen feed source.

In an embodiment, the end view in FIG. 2c shows the position of the feed gas inlet port 112 (0.64 cm diameter) affixed to the chamber wall 122a for chamber 101 at an elevation above that of the free water surface 116 of the stilling zone. Internal chamber walls (e.g. chamber wall 122b) have a single 1.9 cm diameter gas port at this same elevation. These ports alternate between positions 5 cm ahead of the back wall, or 5 cm behind the front wall, to establish the tortuous path (gas flow) shown.

Of course, LHO chambers can vary in geometry as well as scale. Most designs incorporate nested rectangular dimensions, such as those shown in FIGS. 1a, 1b, 2a, 2b, and 2c, but some are wedge shaped to accommodate subdivision of an LHO a with circular cross-section. Froude based scaling of hydraulics, such as the circulation cell described, is valid in those cases where gravity forces predominate, and a free surface is involved. Geometric similitude here, with scale-up, requires identical depth to width ratios in the receiving pool. Using Hp as depth in the example above, and the short dimension of the chamber as width $D_1$, provides a depth to width ratio, $R_L$ of 1.75. Increasing $Q_L$ in a new design with $L_o$ and number of chambers fixed at 0.308 m and 6, respectively, will require wider chambers to accommodate surface loading rate criteria and a growing number of jets per chamber. If it's assumed that Hp is fixed with regard to $L_o$, then increasing chamber widths will decrease $R_l$ indicating scale-up will alter the preferred contacting conditions. This has been confirmed in laboratory trials. Tests show bubble plumes displaced from the jet wake, at depth, ascending to the surface of the pool without uniform distribution within the pool volume that exists outside of the jet impingement zone—chamber volume is now underutilized.

Figure 3:
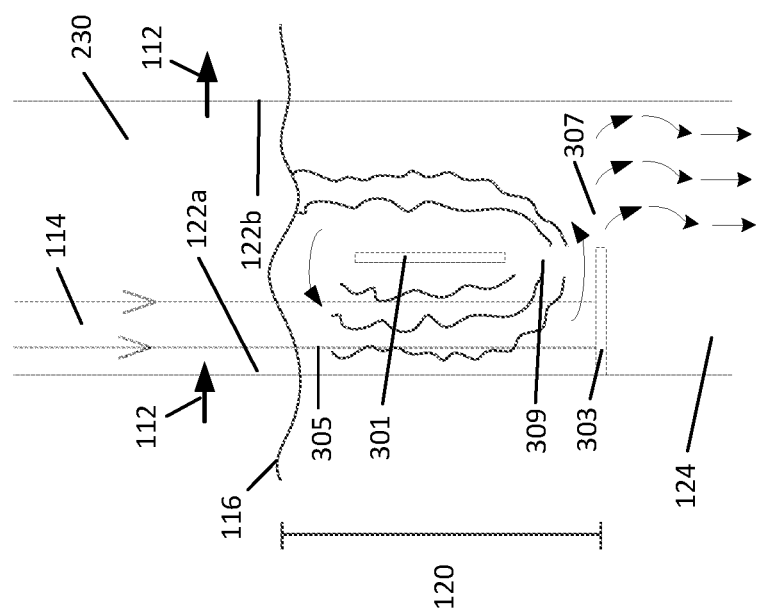
FIG. 3 shows a side view of a single LHO chamber employing the side-flow distribution plate, as well as vertical and horizontal baffles, to encourage bubble release uniformly across the stilling zone width, according to an exemplary embodiment of the present disclosure.

FIG. 3 shows a modification of the LHO chamber 232 that seeks to restore full utilization of chamber volume when reductions in RL below 1.75 are limited. The vertical baffle 301 constrains jet 114 flux, limiting the interaction of downward and upward fluid flows, reducing drag, and allowing for higher bubble plume acceleration in the jet wake compartment 305. The horizontal baffle 303 directs this accelerated flow from chamber wall 122a towards the opposite chamber wall 122b, providing a more complete distribution of the bubbles over the chambers cross section 307. The vertical baffle's 301 position relative to the cross section 307, horizontal baffle 303, and chamber walls 122a, 122b can be related to $L_o$, Vj, jet locations and desired treatment effect. Note that the vertical baffle 301 is attached to the back chamber wall. Further, the vertical baffle 301 remains submerged, and therefore does not block movement of the pool surface waters into the jet wake compartment 305, allowing for the completion of the desired circulation cell. The horizontal baffle's 303 extension from the wall of the cross section 307, perpendicular to fluid flow, is limited to minimize pressure drop across the resulting slots open area 309. The baffles 301, 303 can be used together or individually based on RL's deviation from 1.75 or specific design objectives.

In those cases where chamber width increases are substantial, additional sets of jets can be added to meet performance targets. For example, FIG. 4 shows an exemplary configuration when the cell width of a chamber has been doubled (compared to LHO chamber 232) from 12.7 to 25.4 cm with $R_L$ now 0.875. The distribution plate 401 is also shown, having orifices 108 along two sides, and a solid region 109 in between. Feed water flow rate, $Q_L$, is twice that of the previous example (2×170.3 l/min), as is the total number of impingement jets (2×29). In this new configuration, two counter rotating circulating cells are established with interaction at the midpoint of the chamber boundary $D_2$. Although not shown, the baffles 301, 303 presented in FIG. 3 could be applied, in pairs, to augment performance.

The strategy used here to avoid cell distortion with R=0.875 can be applied when further reductions in $R_L$ are necessary if (1) chamber width $D_1$ is increased in increments of the $D_2$ dimension and (2) $Q_L/m^2$ chamber cross section remains constant. For example, $D_3$ could be 50.8 cm ($R_f$=0.438), 101.6 cm (RL=0.219), 152.4 cm ($R_L$=0.109) etc.

FIG. 5 shows the result when chamber width, $D_3$, is set equal to $2D_2$ or 50.8 cm. $Q_L$ here is 4×170.3 l/min with 4×29 impingement jets 114 applying power at 4 points over $D_3$ along chamber walls 122a, 122b, and positions 505a, 505b adjacent to a baffle 503. The latter two points are adjacent to both sides of a shared vertical baffle 503 extending from a position above the pools free water surface 116 to a submergence level that exceeds $H_p$. The net result of the new configuration is the establishment of 2 pairs of counter rotating cells designed to replicate the gas-liquid contacting conditions illustrated in FIG. 3 despite an $R_L$=0.438. FIG. 5 also shows the resulting orifice 108 schedule for the distribution plate 501 with the two groups of jets offset from the chamber wall 122a, 122b, as well as both sides of the baffle 503 to minimize contact of these components, above the free water surface 116, with jet 114 flows. Similar offsets are used in the configurations illustrated in FIGS. 1a-1b and 3, as well as example plate designs for circular LHO systems as shown in FIGS. 6a and 6b.

Figure 6B:
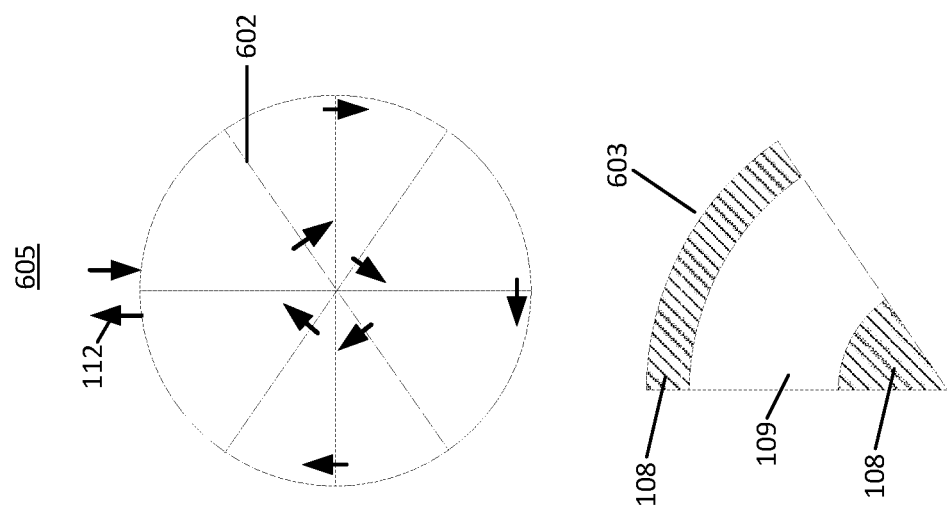
FIG. 6b shows a top view of head-space gas movement through the circular LHO oxygenation system having six chambers, and a top view of a distribution plate that can be used for each chamber to create counter rotating circulation cells, according to an exemplary embodiment of the present disclosure.
Figure 6A:
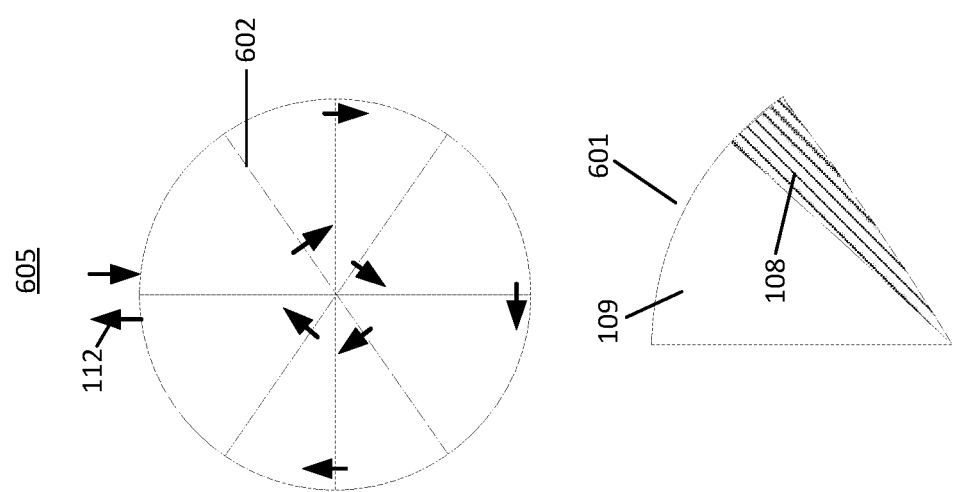
FIG. 6a shows a top view of head-space gas movement through a circular LHO oxygenation system having six chambers, and a top view of a distribution plate portion that can be used for each chamber, according to an exemplary embodiment of the present disclosure.

FIGS. 6a and 6b provide two options for wedge-shaped chambers. FIGS. 6a and 6b show a cross sectional top view of a circular LHO 605 made up of eight wedge-shaped chambers, each chamber being divided by chamber walls 602. Here the central angle of the wedge ($\theta_w$) can be small, typically less than 1 radian (57.3°), and so a uniform distribution of jet locations can be based on the relative area provided by the wedge cross section along the sectors radius ($r_{max}$). For example, FIGS. 6a and 6b show a circular LHO 605 subdivided by eight linked wedges of equal area, providing a $\theta_w$ of 0.785 and a chamber cross sectional area of $\frac{1}{2} r^2_{max} \theta$.

Fixing the distribution of orifices 108, uniformly, over an area representing 31.5% of the available area, as in FIG. 2, sets an angle limit for orifice 108 placement that is equal to $(\theta_w)(0.315)$, or 0.247 radians (14.18°), as illustrated by the distribution plate 601 shown in FIG. 6a. Some distortion of the desired circulation cell will occur, unfortunately, given increasing levels of jet wake confinement as r approaches zero ($r_{min}$).

This same limitation is applied in a second option, shown by the distribution plate 603 in FIG. 6b, that attempts to replicate the two counter rotating cells shown in FIG. 3 by applying jet momentum uniformly along a zone near the sectors arc at $r_{max}$ as well as a zone near the origin of $\theta$ ($r_{min}$). FIG. 6b shows the active areas associated with both zones are, in this example, equal, i.e., $((\frac{1}{2})(R^2_{max})(\theta_w)(0.315))/2$.

An alternate configuration shown in FIG. 7a avoids use of wedge-shaped chambers by establishing a group of parallel partitions that mimic the rectangular section RC s associated with FIG. 3, 4 or 5. The LHO 706 is made up of 10 chambers, defined by the chamber walls 701. A top view of the distribution plate 702 is also shown in FIG. 7a, which can be placed on top of the chamber walls 701.

Likewise, the configuration shown in FIG. 7b establishes these same $R_L$ values in annular space created by a group of concentric chamber walls 703 in an LHO 708 having six chambers. An example of a distribution plate 704 that can be used in LHO 708 is also shown in FIG. 7b.

In one embodiment, optional water-tight bulkheads 710, 711, 712, 713, 714 can be included in both alternative designs shown in FIGS. 7a and 7b to increase the number of chambers within the LHO system boundary, thus improving AE and TE. In one embodiment, the water-tight bulkheads 710, 711, 712, 713, 714 are gas-tight (minus the gas ports that allow gas movement from one chamber to the next).

Figure 8:
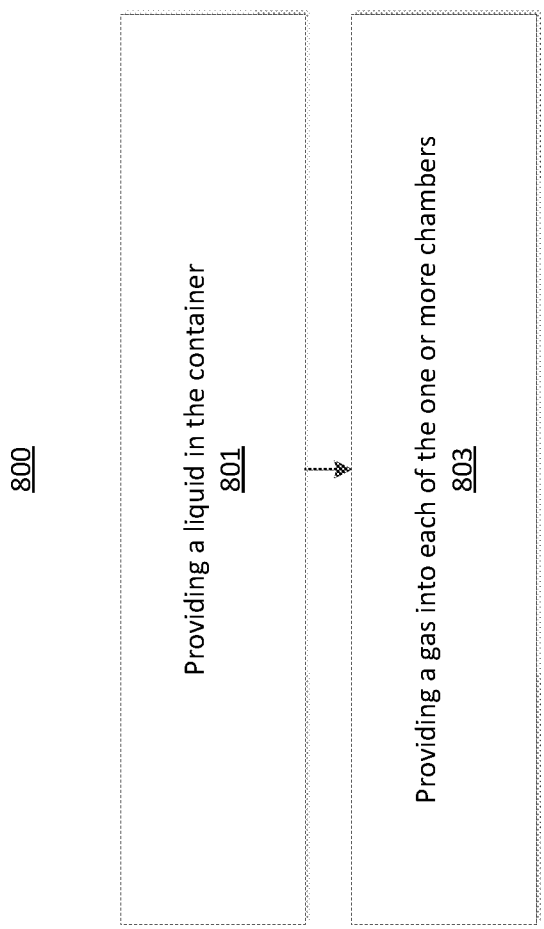
FIG. 8 shows a flowchart of a method, according to an exemplary embodiment of the present disclosure.

FIG. 8 illustrates a method 800 of performing high efficiency oxygenation using a low head oxygenator system including one or more chambers, one or more distribution plates disposed over corresponding chambers, a trough disposed over the one or more distribution plates, and a gas input into each of the one or more chambers, according to an embodiment of the present disclosure.

Step 801 is providing a liquid in the trough such that the liquid flows through orifices in the one or more distribution plates into the one or more chambers, each of the one or more distribution plates having a predetermined number of orifices uniformly distributed within or more zones of the respective distribution plate and no orifices in at least one remaining zone of the respective distribution plate. The liquid flows through the orifices in the one or more distribution plates to create jets. Any of the distribution plates discussed herein, and variations thereof, can be used. The distribution plate, employing the side-flow technique discussed herein, should be tailored to accommodate the geometry of the LHO system (e.g. location of chamber walls, spray fall height, number of chambers, and size of each chamber).

Step 803 is providing a gas through the gas input to each of the one or more chambers, causing the gas to flow through a head-space portion of each of the one or more chambers, above a liquid stored in the one or more chambers. The jets formed in step 801 come into contact with the gas in the head-space portion of each chamber, then enter the liquid within the corresponding chamber at regions disposed directly below the one or more zones of the corresponding distribution plate having the orifices to create one or more circulation cells of bubbles in the liquid held within the corresponding chamber. In one embodiment, horizontal and/or vertical baffles, fully submerged in the liquid, can be attached to a wall of the chamber, which can help to facilitate forming the one or more circulation cells of bubbles.

Tests were performed with the side-flow distribution plate 202 discussed with respect to FIG. 1b, as well as several additional configurations, to evaluate relative performance under typical field conditions. Specifically, both Hp and an oxygen transfer coefficient G at selected spray fall heights ($L_O$) were quantified. G results from the integration of Equation (1) and has been defined as: $G=\ln((C^*-DO_{in})/(C^*-DO_{out}))$, where $DO_{in}$ and $DO_{out}$ are, respectively, chamber influent and effluent DO concentrations. Measured G values were corrected to 20 C based on Equation (2), then compared to $G_{20C}$ established previously for the standard plate design (uniform distribution of orifices) used to date to design LHO equipment. A multi-component gas transfer model, specific to the LHO, and requiring $G_{20C}$ as an input, was then used to predict relative performance (AE, TE, etc.) of both configurations. The test side-flow distribution plate was placed at a depth of 12.7 cm in a rectangular LHO chamber measuring 1.219 m in height×0.508 m in width× 0.127 m thick. The area created above the plate served as the feedwater trough when receiving water from an adjacent stilling zone served by a centrifugal pump. Pump flow was 157 l/min as regulated by a throttle valve and measured with a Signet type paddlewheel flow sensor. Windows placed on the side and end of the chamber allowed observation of the jets, jet impact zone ($H_p$) and stilling zone. The chamber was placed in a sump tank outfitted with additional windows and a water discharge valve used to regulate Lo via changes in pool surface. In operation, water entered the inlet trough, dropped by gravity into the impact zone, then exited the lower open end of the chamber while oxygen was directed into the head-space region at a rate that elevated $X_{O2}$ to within the range 0.65-0.75. Oxygen flow rates were fixed by a Cole-Palmer variable area flowmeter and its integral throttle valve. $X_{O2}$ was measured in chamber off-gas that was vented, continuously, via a 1.9 cm riser extending through the midpoint of the distribution plate and above the free surface of the trough water. $X_{O2}$ was measured with both an Oxyguard Polaris TGP meter and a Quantek Model 201 Oxygen Analyzer. Once DO and $X_{O2}$ had stabilized, the change in DO across the system was determined by measuring DO in the inlet trough and DO in the sumps effluent. DO measurements were made with a YSI Prosolo luminescent probe that also provided water temperature and local barometric pressure. Lo and Hp were then determined with a tape measure. The test range for Lo was 20.3-67.3 cm. C*, needed to calculate resulting $G_{20}$ values, was based on water temperature and local barometric pressure.

Testing of the side flow distribution plate served to validate predictions of an improved Hp, development of a well-defined circulation cell and enhanced gas transfer potential as indicated by $G_{20}$. Regarding gas entrainment, tests of the side-flow plate conducted with Lo=30.48 cm and 60.86 cm demonstrated Hp was, respectively, 34.6% and 28.6% greater than that achieved with the standard plate design. Hp varied little with Lo as indicated by least squares regression of Hp versus Lo (N=29). The insensitivity of Hp with changing Lo simplifies the design of LHO pool depth and may provide for increases in surface loading criteria important in determining equipment scale. $G_{20}$ values established during steady state runs with the side-flow distribution plate were also correlated with Lo based on regression analysis ($r^2$=0.9516). This model is similar in format to the regression equation developed previously for $G_{20}$ provided by the standard plate design (uniform distribution of jets on water distribution plate) and currently being used to design LHO equipment. Inspection of both regression models reveals the Side-flow $G_{20}$ exceeds Standard $G_{20}$ when Lo is greater than 15 cm. Improvements, as a percent, are significant and rise with increasing Lo up to the Lo limit of the laboratory tests (67.3 cm), e.g., when Lo=35.6, 50.8, and 67.3 cm, percent improvements in $G_{20}$ over the standard design are 38.1%, 57.5% and 73.3%, respectively. $G_{20}$ is a log function related to the degree of removal of the dissolved gas deficit, (C*–C), by the function: % Removal=$(1-e^{-G20})$ 100. With Lo=67.3 cm, deficit removal, based on $G_{20}$, will be 44.97% for the standard plate design and 64.65% for the side-flow case, an improvement here of 43.76%. To further quantify the positive effects of the side-flow configuration we simulated LHO performance using the multi-component gas transfer model described earlier. Performance was predicted under a standard set of operating conditions (15 C; $DO_{in}$, =8 mg/l) with the number of stages fixed at 6. We adjusted oxygen feed rate until the predicted AE matched target AE values of 70, 75, 80, 85, and 90%. Table 1 summarizes example performance predictions (8 of 20) when Lo was 45.72 cm. The variables followed included required oxygen feed rate (% of water flow), $DO_{out}$ (mg/l), oxygen transfer rate (lb's/day), TE (lb's/hp·hr) and nitrogen transfer rate (lb's/day).

TABLE 1

Simulated effects of distribution plate design on LHO performance (Lo = 45.72 cm)

| Plate Design | Target AE | Gas Feed | $DO_{out}$* | Lb $O_2$/d | TE** | Lb$N_2$/d |
|---|---|---|---|---|---|---|
| Standard | 75% | 0.88% | 16.75 | 105.04 | 6.06 | 38.97 |
| Side-Flow | 75% | 1.20% | 19.93 | 143.16 | 8.26 | 53.41 |
| Standard | 80% | 0.74% | 15.86 | 94.41 | 5.45 | 34.56 |
| Side-flow | 80% | 1.01% | 18.72 | 128.74 | 7.42 | 47.40 |
| Standard | 85% | 0.60% | 14.76 | 81.18 | 4.68 | 29.08 |
| Side-flow | 85% | 0.82% | 17.23 | 110.85 | 6.40 | 39.94 |
| Standard | 90% | 0.44% | 13.24 | 62.95 | 3.63 | 21.52 |
| Side-flow | 90% | 0.59% | 15.02 | 84.23 | 4.86 | 28.84 |

*mg/l
**Lb $N_2$/Hp hr

Note that for a selected AE, LHO's incorporating the side-flow configuration are able to operate at a higher oxygen feed rate, that, in turn, increases all performance indicators. The oxygen transfer rate per day, for example, increased, on average, 35.9% over the oxygen transfer rate predicted for the standard plate design. The benefits shown in Table 1 improved further when Lo was elevated to 76.2 cm. In this case oxygen transfer per day was 46.8% higher than the standard plate application. Combined, simulation data show the side-flow plate design will reduce the hydraulic head required for a selected $DO_{out}$ or can be used to improve the performance of an existing LHO where Lo is fixed. The side-flow design also provides for enhanced nitrogen stripping capabilities.

Related to stripping, the concentration of jets along chamber walls and/or vertical baffles make each chamber's head-space region available for application of scrubbing component inserts. In one embodiment, scrubbing component inserts can be placed in the head-space region of one or more chambers to perform stripping. FIGS. 9A-9C illustrate three exemplary configurations of chambers 901, 903, and 905 that use scrubbing inserts 910, 911, and 912, all of which are based on the use of short, packed beds (914 or 915) irrigated with a 2N NaOH solution to selectively react away DC desorbed from the jets 114, though it can be appreciated that other solutions besides NaOH can be used in other embodiments. The NaOH solutions can be applied by one or more solution feed lines 907 (e.g. nozzles, liquid distributors), then collected in sumps 909 plumbed to one or more source pumps for recirculation and reuse. Further, the scrubbing solution recirculation loops can be specific to a single stage of the multi-stage LHO, or specific to a group of chambers comprising a single LHO or specific to a selected group of LHO's within the aquaculture facility. The pH of the scrubbing solution can be maintained at or above a predetermined value (e.g. 11.4) with additions of NaOH in a feedback loop. NaOH can react with the DC to form sodium carbonate ($Na_2CO_3$) which has a lower equilibrium pH. A mixture of spent NaOH and $Na_2CO_3$, collected as an overflow from a scrubbing insert sump 909, can then be regenerated for reuse in a batch process using hydrated lime ($Ca(OH)_2$). $Ca(OH)_2$+NaOH generates the products $CaCO_3$+NaOH. The $CaCO_3$ produced can be separated from the mixture by gravity and/or filtration before reuse of the NaOH.

Alternatively, packed beds (914 or 915) disposed within the scrubbing inserts 910, 911, or 912 could be irrigated directly with a hydrated lime solution facilitating the reaction $Ca(OH)_2+CO_2$ to yield $CaCO_3$. The elevated pH scrubbing solution feed rates to the scrubbing inserts 910, 911, or 912 can represent a small fraction of the water flow through the oxygen absorber given the positive effect of chemical reaction on the gas transfer rate (Equation (1)) as quantified by the enhancement factor β, a ratio of gas transfer with and without chemical reaction. The absorption of DC is considered a pseudo-first-order reaction with regard to DC when the concentration of OH in the bulk scrubbing solution is relatively high and varies little across the scrubbing inserts 910, 911, or 912. β values of between 8 and 250 have been reported when scrubbing DC with NaOH in packed columns, and β values of between 1.2 and 60 have been reported for sphere and bubble columns. In one instance, gas transfer rates increase rapidly with increasing NaOH normality up to about 2N. Further increases in normality can decrease gas transfer rates given concurrent increases in solution viscosity. Gas transfer rates can also decrease as the conversion of NaOH to $Na_2CO_3$ increases, hence the incorporation of a feedback control loop which can regulate NaOH additions based on scrubber solution pH. Scrubber performance can also be enhanced by elevating packing irrigation rates, gas feed rates, and with elevated scrubber solution temperature. It is understood that the scrubbing solutions used will attempt to reach an equilibrium with the head-space gases following Equations (1)-(5), including oxygen. Accordingly scrubbing solutions can in some cases become oversaturated with oxygen, such as the LHO chambers close to the gaseous oxygen feed point (e.g., chamber 101 of LHO 100). Therefore scrubbing solutions sump and other recirculation loop components outside of the LHO shell can be designed to minimize or eliminate exposure of the solution to the local atmosphere so as to stop oxygen losses from the system due to desorption.

FIGS. 9A-9C show that each chamber 901, 903, and 905 has a dedicated NaOH solution feed line 907 and sump 909 drain line that, in this example, pass through a gas tight LHO shell. Scrubbing insert 910, 911, or 912 placement ensures (1) no interference with chamber to chamber gas movement (2), no direct contact with jets 114 and (3), no leakage of NaOH into the stilling zone 124. $CO_2$ scrubbing efficiency, as indicated by changes in DC, is regulated by NaOH solution pH, packing type and depth, NaOH irrigation rate, and head-space gas throughput.

FIG. 9A shows an end view of a chamber 901, which is similar to the chambers 101, 102, 103, 104, 105, 106 from the LHO 100, but with the addition of a scrubbing insert 910, attached to one or more chamber walls, in the head space region 230 adjacent to, but not in direct contact with, the jets 114. In other words, the scrubbing insert 910 is located underneath the solid region 109 of the distribution plate 110 having no orifices. The scrubbing insert 910 includes a solution feed line 907, vents 913, packed bed 914, chimney 917, chimney cap 919, sumps 909, and skirt 921. The solution feed line 907 releases NaOH into the packed bed 914, which spreads the NaOH solution across various distribution points as it flows downwards towards the sumps 909. In one embodiment, the amount of NaOH solution released by the solution feed line 907 can vary based on scrubber solution pH, which can be known ahead of time and/or measured in real time using a pH sensor and corresponding circuitry. As the jets 114 contact the free water surface 116 and generate circulation cells of bubbles in the stilling zone 124, the scrubbing insert 910 captures the ascending gas bubbles using the skirt 921, which is partially submerged in the stilling zone 124. The skirt 921 can act to separate the ascending gas bubbles from the jets 114. This gas can then pass through the chimney 917 and towards the packed bed 914, rising above a NaOH solution's free surface in the sumps 909. The chimney cap 919 prevents leakage of NaOH into the stilling zone 124. The downward flowing NaOH solution and the upward ascending gas react as they come into contact. Treated gas exits the top of the scrubbing insert 910 via the vents 913, allowing gas recirculation within the area near the jets 114 and immediately below the lower surface of the side-flow distribution plate 110. The ceiling of the scrubbing insert 910 will act to eventually push the treated gas towards one of the vents 913.

FIG. 9B shows an end view of a chamber 903 similar to the chamber 901 discussed with respect to FIG. 9A, but without the skirt 921. Further, the chamber 903 shown in FIG. 9B allows for passive diffusion of head-space gases into and out of the packed bed 915 via openings 923 strategically located on the sides and ends of the scrubbing insert 911. Note that the openings 923 can be configured to prevent jet 114 intrusions into the elevated pH packed bed 915 and sump 909, as well as to prevent NaOH leakage. In one embodiment, this can look like using roofs 925, angled away from the jets 114 and towards the packed bed 915. Also note that, in this example, to accommodate for the roof 925, the packed bed 915 is slightly smaller than the packed bed 914 from FIG. 9A. Further, for the sake of simplicity, although the chamber 903 has four pairs of openings 923 and roofs 925, only one pair was labelled. It can be appreciated that the number, location, and/or configurations of the openings 923 and/or roofs 925 can vary in other scenarios.

FIG. 9C shows an end view of a chamber 905 similar to the chamber 901 discussed with respect to FIG. 9A, but with the addition of a fan 927, which can be low-power and rated for oxygen service, configured to provide for gas flow through the packed bed 914. In this example, the fan 927 pulls gas generated by the circulation cells of bubbles from near the free water surface 116 through the chimney 917 and towards the packed bed 914 (as indicated by the dashed arrows), The fan 927 is attached to the chimney cap 919 in this exemplary embodiment, though the fan 927 (either the same fan or an additional fan) could be located at other positions in other embodiments. For instance, a second fan can be located on the scrubbing insert's 912 ceiling so as to draw gas up from the lower regions of the packed bed 914. As another example, rotation of the fan 927 can be reversed to draw gas from the head space region of the jets 114, and force this gas downward through the packed bed 914 for release through the chimney 917.

In cases where head space volume available for the scrubbing insert 910, 911, or 912 is limited, the scrubbing insert 910, 911, or 912 could be elevated above, at least partially, the distribution plate 110 by penetration of the distribution plate 110 with a gas tight enclosure designed to not interfere with the distribution plate's 101 active orifices 108.

Incorporation of a scrubbing insert can be implemented in any of the chambers discussed herein, as well as variations thereof. For example, one or more scrubbing inserts can be placed in head-space regions of circular chambers, rectangular chambers, chambers having horizontal baffles, chambers having vertical baffles, et cetera. As can be appreciated, the shape of the scrubbing insert can also vary to accommodate various chamber geometries. Moreover, in an LHO having multiple chambers, one or more scrubbing inserts can be placed in a select number of chambers, or in every chamber. Further, it is understood that the irrigated packed beds described could be replaced with granular/porous (dry) reagents capable of capturing head space $CO_2$. Reagents here include lithium hydroxide, metal-organic frameworks (MOF's), zeolites, mesoporous silica, clay, porous carbons, porous organic polymers (POP's) and metal oxides. Use of the dry reagents can avoid carryover of oxygen in scrubbing solutions as just described, and the scrubbing inserts can be designed with LHO stage specific access ports allowing removal of spent reagents and replacement with fresh reagents. Certain spent dry reagents can be regenerated for reuse in a separate treatment step that can include heating and forced air exchange.

Figure 10:
FIG. 10 shows a flowchart of a method, according to an exemplary embodiment of the present disclosure.

FIG. 10 illustrates a flowchart outlining a method 1000, according to one exemplary embodiment. Steps 1001 and 1003 are the same as steps 801 and 803, respectively, from method 800. Method 1000 adds the additional capability of being able to perform stripping by utilizing head-space made available by the incorporation of the side-flow distribution plates discussed herein. A scrubbing insert (e.g. scrubbing insert 910, 911, 912) can be placed in the head-space region, and perform stripping on gas released from circulation cells of bubbles using a scrubbing reagent.

Step 1005 is providing a scrubbing reagent to a packed bed (e.g. packed bed 914 or 915). In one embodiment, a solution feed line dispenses the scrubbing reagent (e.g. NaOH, $Ca(OH)_2$) to the packed bed. The scrubbing reagent can be dispensed near a top portion of the packed bed such that it flows downwards due to gravity. The scrubbing insert can contain a sump located under the packed bed to capture the scrubbing reagent and prevent it from leaking into the stilling zone. The scrubbing insert can also include a chimney cap to prevent the scrubbing reagent from leaking into the stilling zone in areas that the sump does not cover. In one embodiment, the packed bed can be irrigated directly with a scrubbing reagent (e.g. hydrated lime), which is then drained from the packed bed.

Step 1007 is directing gas from the circulation cells of bubbles through the packed bed. In one embodiment, this is done by placing the scrubbing insert directly above the location where the gas from the circulation cells of bubbles are generated. As the gas floats upwards, it can flow into the scrubbing insert and through the packed bed. A skirt can also be used to direct the gas towards the packed bed, and kept away from any jets. In one embodiment, one or more fans can also be implemented to push and/or pull the gas through the packed bed and through the vents. In one embodiment, step 1007 can be performed before or at the same time as step 1005.

When the gas from step 1007 is directed through the packed bed, the gas reacts with the scrubbing reagent provided in step 1005 to strip $CO_2$ from the gas. As this gas reacts and eventually exits the packed bed, the gas can flow through the vents and recirculate to nearby jets. This gas can be directed to flow through the vents via the scrubbing insert's ceiling, which will act to contain the gas and eventually direct it towards the vents, and/or a fan. Alternatively, as previously mentioned, a fan can act to draw gas near jets in through the vents, and through the packed bed.

While the description above focuses on a non-pressurized LHO design, the systems and methods discussed herein can be implemented as a vacuum degasser or a medium pressure (side-stream) oxygenator. The side flow distribution plates can improve AE and TE by reducing column vacuum requirements, thereby lowering operating costs and providing savings in oxygen feed requirements.

In one embodiment, a vacuum degasser operating with a side-flow distribution plate can have water flooded over the distribution plate where the container holding the water and the distribution plate is isolated from the atmosphere (e.g. by a blind flange covering an open top of a trough). Feed water jets created by the distribution plate can drop into a stilling zone of a chamber, then exit the chamber via a flanged pipe connected to a bottom portion of the chamber to a water pump. The free surface of the stilling zone can be maintained at a level providing a target $L_o$ by placement of a water jet exhauster at an appropriate elevation above a bottom flange plate of the chamber, the bottom flange plate having no discharge slots. An exhauster can pull off-gas out of the last chamber of a multi-stage reactor, thus causing headspace gas movement, sequentially, from the oxygen introduction point (i.e. first chamber) to the last chamber via individual chamber gas ports. These ports can be located above the free surface of the stilling zone.

Water jet exhauster performance drops with flooding, which keeps the free surface of the stilling zone from changing with adjustments in gas or water feed rates. The exhauster is served by a dedicated stream of high-pressure water that transfers the energy required to both extract and carry away off-gas from the last chamber. High vacuum levels within the chambers can be generated by a water pump coupled with a lower column discharge flange. The pump can pull water through an inlet throttle valve without air entrainment as the chamber's internal free surface is fixed by the water jet exhauster. The water pump can also provide a discharge pressure needed to deliver treated water to its use point. Vacuum and water flow rates can be adjusted by changes in both the inlet and pump discharge throttle valves. This configuration of the reactor's chambers, as well as the positioning of the water jet exhauster directly at the elevation point providing the desired $L_o$, eliminates the need for a down-stream off-gas separator, prior to pumping.

The systems and methods discussed herein may also be embodied in a pressurized multi-stage oxygenator (NIIO) that uses a side-flow distribution plate. Water can be forced into a sealed column's flooded distribution plate zone (i.e. above the side-flow distribution plate), via pump action, then drop as jets to the free surface of the stilling zone. The water provides the quiescent conditions needed for bubble-water separation prior to water release via a valved discharge port. Partially restricting this valve allows column gage pressures to rise to target levels as provided by the feed water pump. Oxygen can be metered into a first chamber of a multi-chamber system. Off-gas can exit the system via a float valve coupled to the final chamber. The valve position can regulate off-gas release based on a decrease in stilling zone depth caused by oxygen feed rates that exceed oxygen absorption rates. As in the vacuum degasser, gas release initiates gas movement from the first chamber, sequentially, to the last chamber via individual gas ports positioned in chamber walls above the free surface of the stilling zone. Chamber walls can extend well below the bubble entrainment zone to ensure bubbles do not escape individual chamber boundaries. Chamber walls are also gas-tight where chamber walls intersect the underside of the water distribution plate, as well as the system shell.

Obviously, numerous modifications and variations are possible in light of the above teachings. It is therefore to be understood that within the scope of the appended claims, embodiments of the present disclosure may be practiced otherwise than as specifically described herein.

Thus, the foregoing discussion discloses and describes merely exemplary embodiments of the present disclosure. As will be understood by those skilled in the art, the present disclosure may be embodied in other specific forms without departing from the spirit thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

The invention claimed is:

1. An oxygenator system comprising:
   one or more chambers, each of the one or more chambers having an open top;
   one or more distribution plates, each distribution plate disposed over the open top of one or more corresponding chambers of the one or more chambers, each of the one or more distribution plates having a predetermined number of orifices distributed within one or more zones of a respective distribution plate and no orifices in at least one remaining zone of a respective distribution plate;
   a container, disposed on top of the one or more distribution plates, configured to allow a first liquid contained in the container to flow through the orifices of the one or more distribution plates into the one or more chambers; and
   one or more scrubbing inserts, each of the one or more scrubbing inserts disposed below a corresponding distribution plate, each of the one or more scrubbing inserts configured to perform carbon dioxide stripping, wherein
     the first liquid flows through the orifices of the one or more distribution plates to create jets between a wall of the one or more corresponding chambers and a corresponding scrubbing insert,
     the jets enter a second liquid held within each of the one or more chambers at one or more regions disposed directly below the one or more zones of the one or more distribution plates having the orifices, to create one or more circulation cells of bubbles, and gas generated by the one or more circulation cells of bubbles moves upward into and through a corresponding scrubbing insert, which strips carbon dioxide from the gas.

2. The system of claim 1, wherein
   the one or more zones having the predetermined number of orifices of each distribution plate are located near at least one wall of the one or more corresponding chambers, and
   the one or more scrubbing inserts are positioned below the at least one remaining zones of the respective distribution plates having no orifices.

3. The system of claim 1, at least one chamber of the one or more chambers further comprising at least one vertical baffle, attached to a wall of a respective chamber, the baffle extending below a penetration depth of the jets, wherein
   the at least one remaining zone of each distribution plate having no orifices includes two end zones of the respective distribution plate and one or more center zones between the two end zones of the respective distribution plate, and
   each vertical baffle is located underneath at least one of the one or more center zones having no orifices of the corresponding distribution plate.

4. The system of claim 1, at least one chamber of the one or more chambers further comprising at least one horizontal baffle, fully submerged in the liquid held within a respective chamber and attached to at least one wall of the respective chamber, the at least one horizontal baffle being configured to direct the bubbles in the one or more circulation cells from regions of the liquid held in the respective chamber and exposed to the jets towards regions of the liquid held in the respective chamber and not exposed to the jets.

5. The system of claim 1, at least one chamber of the one or more chambers further comprising at least one vertical baffle, fully submerged in the liquid held within a respective chamber and attached to at least one wall of the respective chamber, the at least one vertical baffle configured to separate downward flowing bubbles in the one or more circulation cells from upward flowing bubbles in the one or more circulation cells.

6. The system of claim 1, at least one chamber of the one or more chambers further comprising
   at least one horizontal baffle, fully submerged in the liquid held within the respective chamber and attached to at least one wall of a respective chamber, the at least one horizontal baffle being configured to direct the bubbles in the one or more circulation cells from regions of the liquid held in the respective chamber and exposed to the jets towards regions of the liquid held in the respective chamber not exposed to the jets, and at least one vertical baffle, fully submerged in the liquid held in the respective chamber and attached to at least one wall of the respective chamber, the at least one vertical baffle being configured to separate downward flowing bubbles in the one or more circulation cells from upward flowing bubbles in the one or more circulation cells.

7. The system of claim 1, wherein the one or more scrubbing inserts are disposed (1) between the one or more distribution plates and a surface of the second liquid, and (2) under one or more regions from the at least one remaining zone having no orifices.

8. The system of claim 1, wherein
   the one or more scrubbing inserts comprise a solution feed line,
   the solution feed line is configured to release a scrubbing reagent into a packed bed, the gas reacts with the scrubbing reagent to form treated gas, and
   the scrubbing reagent is at least one of sodium hydroxide or hydrated lime.

9. The system of claim 1, further comprising a fan attached to the one or more scrubbing inserts, wherein the fan is configured to direct the gas through a packed bed.

10. An oxygenator system comprising:
    a chamber, having one or more chamber walls and an open top, configured to hold a first liquid;
    a distribution plate disposed over the open top and configured to create one or more circulation cells of bubbles in the first liquid, wherein the distribution plate has a predetermined number of orifices located in one or more zones of the distribution plate and at least one remaining zone of the distribution plate having no orifices;
    a container, disposed on top of the distribution plate, configured to allow a second liquid contained in the container to flow through the predetermined number of orifices of the distribution plate towards the first liquid to create the one or more circulation cells of bubbles; and
    a scrubbing insert configured to perform stripping of gas released by the one or more circulation cells of bubbles, wherein the scrubbing insert is disposed below the distribution plate.

11. The system of claim 10, wherein the scrubbing insert comprises at least one of a skirt, chimney, chimney cap, fan, packed bed, vent, and solution feed line.

12. The system of claim 11, wherein
the gas released by the one or more circulation cells of bubbles passes through the packed bed and reacts with a scrubbing reagent in the packed bed to form a treated gas, and
the treated gas exits the vent and comes into contact with the second liquid after the second liquid has flown through the predetermined number of orifices but before the second liquid has contacted the first liquid.

13. The system of claim 10, wherein the one or more zones of the distribution plate having the predetermined number of orifices cover an area between 20%-35% of a total area of the distribution plate.

14. A method of performing oxygenation using an oxygenator system including one or more chambers, one or more distribution plates disposed over one or more corresponding chambers, a container disposed over the one or more distribution plates, one or more scrubbing inserts disposed below corresponding distribution plates, and a gas input into each of the one or more chambers, the method comprising:
providing a first liquid in the container, such that the first liquid flows through orifices in the one or more distribution plates into the one or more chambers to form one or more circulation cells of bubbles in a second liquid contained in the one or more chambers, each of the one or more distribution plates having a predetermined number of orifices uniformly distributed within one or more zones of a respective distribution plate and no orifices in at least one remaining zone of a respective distribution plate;
providing a first gas through the gas input to each of the one or more chambers, causing the first gas to flow through a head-space portion of each of the one or more chambers, above the second liquid;
providing a scrubbing reagent to a packed bed disposed within each of the one or more scrubbing inserts; and
directing at least some of a second gas released by the one or more circulation cells of bubbles through the packed bed to react with the scrubbing reagent and form treated gas, wherein
the first liquid flowing through the orifices in the one or more distribution plates creates jets that come in contact with the first gas in the head-space portion of the respective chamber and then enter the second liquid held within the respective chamber at regions disposed directly below the one or more zones of the corresponding distribution plates having the orifices, to create the one or more circulation cells of bubbles in the second liquid held within the respective chamber.

15. The method of claim 14, wherein the one or more zones having the predetermined number of orifices of each distribution plate are located near at least one wall of the one or more corresponding chambers.

16. The method of claim 14, at least one chamber of the one or more chambers further comprising at least one vertical baffle, attached to a wall of a respective chamber, the baffle extending below a penetration depth of the jets, wherein
the at least one remaining zone of each distribution plate having no orifices includes two end zones of the respective distribution plate and one or more center zones between the two end zones of the respective distribution plate, and
each vertical baffle is located underneath at least one of the one or more center zones having no orifices of the corresponding distribution plate.

17. The method of claim 14, at least one chamber of the one or more chambers further comprising at least one horizontal baffle, fully submerged in the liquid held within a respective chamber and attached to at least one wall of the respective chamber, the at least one horizontal baffle being configured to direct the bubbles in the one or more circulation cells from regions of the liquid held in the respective chamber and exposed to the jets towards regions of the liquid held in the respective chamber and not exposed to the jets.

18. The method of claim 14, further comprising directing the treated gas towards the jets.

19. The method of claim 14, wherein the directing is done by a fan disposed on the one or more scrubbing inserts.

20. The method of claim 14, wherein the one or more zones of the distribution plate having the predetermined number of orifices cover an area between 20%-35% of a total area of the distribution plate.

* * * * *